US011928898B2

(12) United States Patent
Olalere

(10) Patent No.: US 11,928,898 B2
(45) Date of Patent: Mar. 12, 2024

(54) SYSTEMS AND METHODS FOR FACILITATING VEHICLE RELATED PROBLEMS

(71) Applicant: Autolab Inc., Brampton (CA)

(72) Inventor: Ayobami Abayomi Olalere, Brampton (CA)

(73) Assignee: Autolab Inc., Brampton (CA)

( * ) Notice: Subject to any disclaimer, the term of this patent is extended or adjusted under 35 U.S.C. 154(b) by 252 days.

(21) Appl. No.: 17/175,564

(22) Filed: Feb. 12, 2021

(65) Prior Publication Data

US 2021/0398363 A1 Dec. 23, 2021

Related U.S. Application Data

(60) Provisional application No. 62/947,990, filed on Dec. 13, 2019.

(51) Int. Cl.
G07C 5/00 (2006.01)
G07C 5/08 (2006.01)
H04W 4/80 (2018.01)

(52) U.S. Cl.
CPC ........... *G07C 5/008* (2013.01); *G07C 5/0808* (2013.01); *G07C 5/0816* (2013.01); *H04W 4/80* (2018.02)

(58) Field of Classification Search
CPC .... G07C 5/008; G07C 5/0808; G07C 5/0816; H04W 4/80
See application file for complete search history.

(56) References Cited

U.S. PATENT DOCUMENTS

| 8,977,423 B2 * | 3/2015 | Merg | G07C 5/006 |
| | | | 701/32.7 |
| 9,773,353 B2 * | 9/2017 | Naamani | H04W 4/80 |
| 10,604,013 B1 * | 3/2020 | Briggs | G07C 5/085 |
| 10,938,971 B2 * | 3/2021 | Sasaki | H04M 1/6091 |
| 2009/0054069 A1 * | 2/2009 | Calnan, III | H04L 69/32 |
| | | | 455/445 |
| 2013/0305262 A1 * | 11/2013 | Nara | G06F 9/4484 |
| | | | 715/810 |

* cited by examiner

Primary Examiner — John A Tweel, Jr.
(74) Attorney, Agent, or Firm — Christopher J Dynowski; Ryan W Dupiu; Ade: Company, DC

(57) ABSTRACT

A vehicle diagnostic system and related method comprises an interface component connected to a vehicle's On-Board Diagnostics (OBD) port, interface elements comprising: a short range communication module; and a vehicle network protocol interface; short range communication module designed to automatically constitute a data link with a mobile communication device running a gateway module; vehicle network protocol interface configured to intercommunicate bi-directionally with short range communication module to obtain requests from gateway module and to send vehicle data to gateway module: said vehicle network protocol interface further configured to communicate bi-directionally with OBD port to send requests to the vehicle's networks and to derive vehicle data therefrom.

6 Claims, 28 Drawing Sheets

SYSTEMS AND METHODS FOR FACILITATING VEHICLE RELATED PROBLEMS

This application claims the benefit under 35 U.S.C. 119(e) of U.S. Provisional application Ser. No. 62/947,990 filed Dec. 13, 2019, which is incorporated by reference herein.

FIELD OF THE INVENTION

The present invention relates generally to data processing. More specifically, the present invention is systems and methods for facilitating vehicle related problems.

BACKGROUND

In an economy where owning a vehicle is no longer considered a luxury, but a necessity to earn a living, the number of vehicle owners (both personal and commercial) have grown and continues to increase exponentially. In Canada alone, approximately 34M vehicles were registered in 2016 and the number of automobile workshops licensed in 2016 was about 47,000. In the US, and other major economies, the number of cars on the road is growing exponentially partly because of the population size, and an upward economic change in the standard of living. This progression in the number of automobile owners provide opportunity for auto dealers to increase their customers' base, but also put a pressure on the automobile owners to find qualified, experienced, competitive, and warranted auto repair garage to maintain and to service their automobiles.

Automobiles remain Canadians' second largest investment besides their housing investment. Such a valuable asset requires adequate protection to maintain Its durability. Unfortunately, automobile owners have been at the mercy of some auto garages, and betrayed by those repair workshops, who delivered sub-standard services, and in some cases, a shoddy job with escalated price, severe service delay, and non-warranted repairs, which have further threatened the abilities of many auto owners to keep their automobile in functioning and road-worthy shape.

Price gauging has been identified as one of the causes of increase in service costs among the big auto repair workshops with the largest market share. Many of these workshops continue to reap from the innocence of an average auto owner who has no understanding of their automobile repair needs or cost of the parts, source of their vehicle problems and what it means by an Autoshop claiming the vehicle has been fixed. But the same issues resurfaced in less than 3 months.

Despite the Consumer Acts and other by-laws, automobile users continue to struggle with a huge cost of repair, and sometimes, quality issue. Getting a fair and competitive price for auto repairs remain a challenge for most auto users. Unfortunately, there is no clear or easily accessible path to obtain a comparative market price by executing a systematic global search based on user's location. This leaves auto users or consumers with limited choice of obtaining fair pricing or market rate for their auto repair.

In the last couple of years, there has been a consecutive decline in auto market sales indicating that auto care needs are growing exponentially. Instead of buying new automobiles, consumers are keeping their old automobiles thus, requiring the service of expert auto garages and technicians at an affordable and competitive rate.

Auto-repair industry is largely fragmented and not able to streamline services as per market needs. The traditional approach has left many automobile owners frustrated and disappointed at the level of modernization and technology advancement in the auto repair industry. Auto owners do not have easy accessibility over valuable auto care knowledge bank or repository, mapped specifically and targeted towards their needs.

Most Auto owners do not have easy access or feasibility to the cost of auto spare parts which often results in auto owners' extortion by their respective automotive repair shop.

Therefore, there is a need for improved systems and methods for facilitating vehicle related problems that may overcome one or more of the above-mentioned problems and/or limitations.

SUMMARY OF THE DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, systems and methods for facilitating vehicle related problems are disclosed. Further, a Scanboss device may be a diagnostic device that may read automobile computerized system to look for errors or auto related problems, then produce the report via an auto connecting platform. Further, the Scanboss device primarily does code scanning, error diagnosis, engine light interpretation then links up with the Repair Boss to get the estimate of the repair cost, repair scheduling, nearby garage, and duration.

Further, a RepairBoss platform may be an auto connecting platform that connects auto owners with auto repair garages. Further, the RepairBoss platform may provide a repair estimate based on current location of the auto owner using algorithm and artificial intelligence. Further, the RepairBoss platform may offer a scheduling and appointment booking system for auto owners to schedule their next repair at their choice of repair garage. Further, the RepairBoss platform may connect with Rental car companies, collision reporting centers, auto and repair insurance brokers, car detailing shops.

Further, a Spareboss platform may be an auto spare parts platform where auto garages can buy and sell OEM, aftermarket and used spare parts. Further, the Spareboss platform may be integrated with shipping companies and powered by e-commerce for full payment of spare parts.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants.

In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

Figure 1:
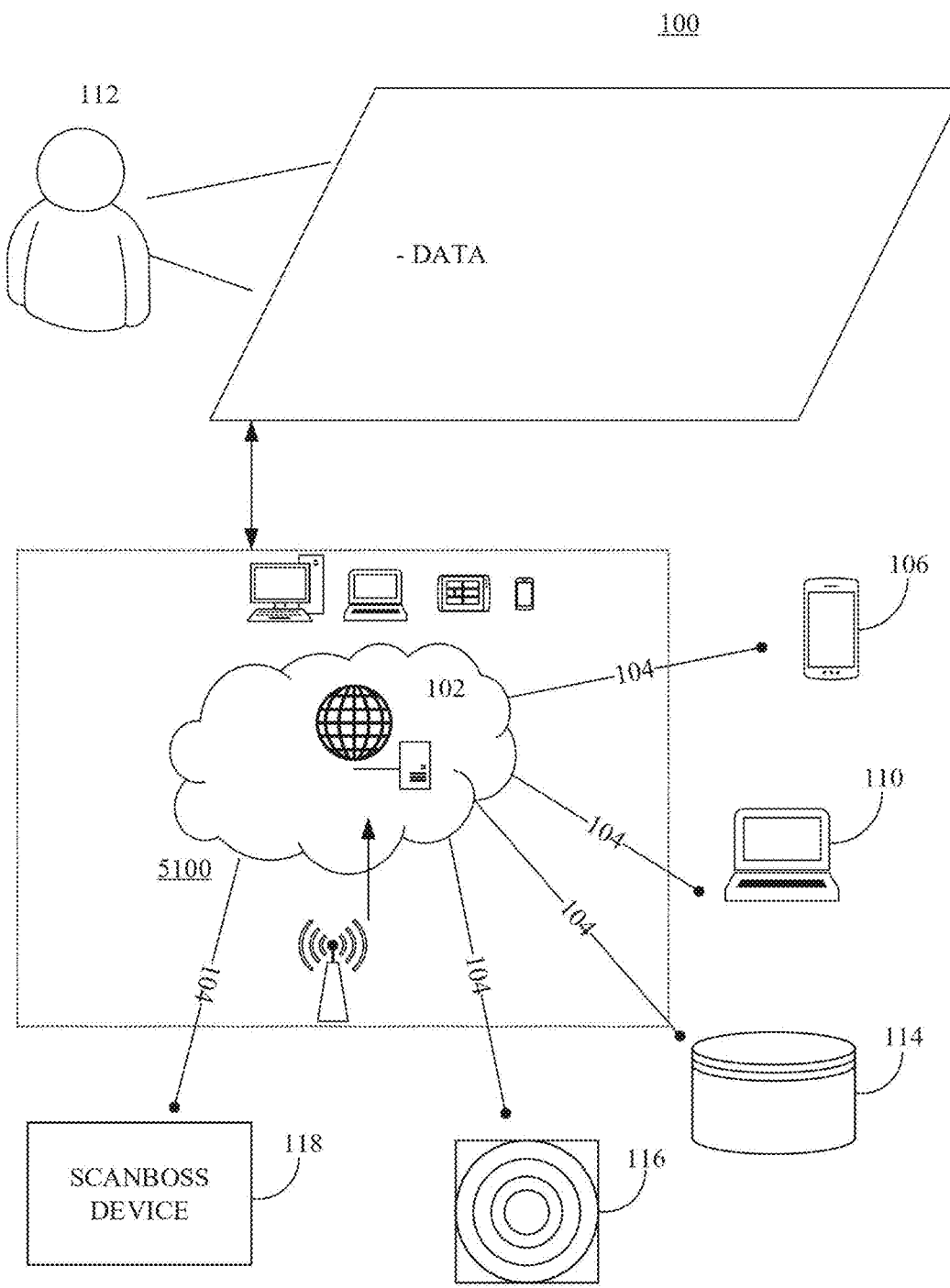

FIG. 1 is an illustration of an online platform consistent with various embodiments of the present disclosure.

Figure 2:
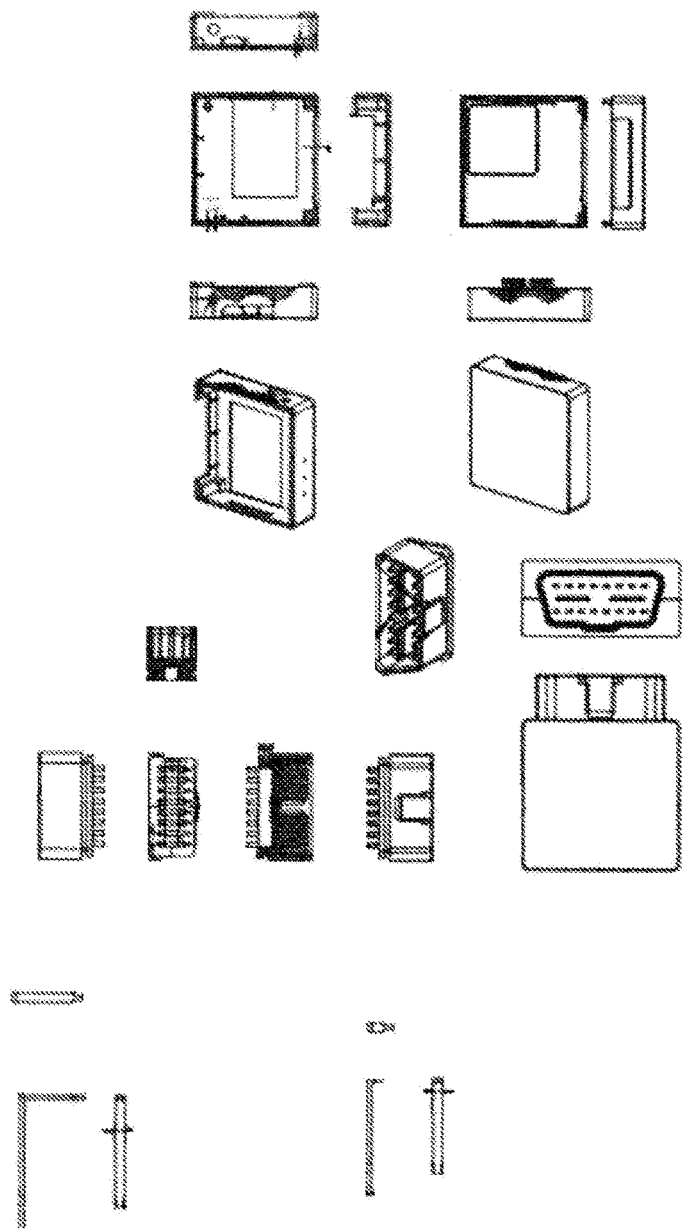

FIG. 2 is a schematic showing various views of a ScanBoss device, in accordance with some embodiments.

Figure 3:
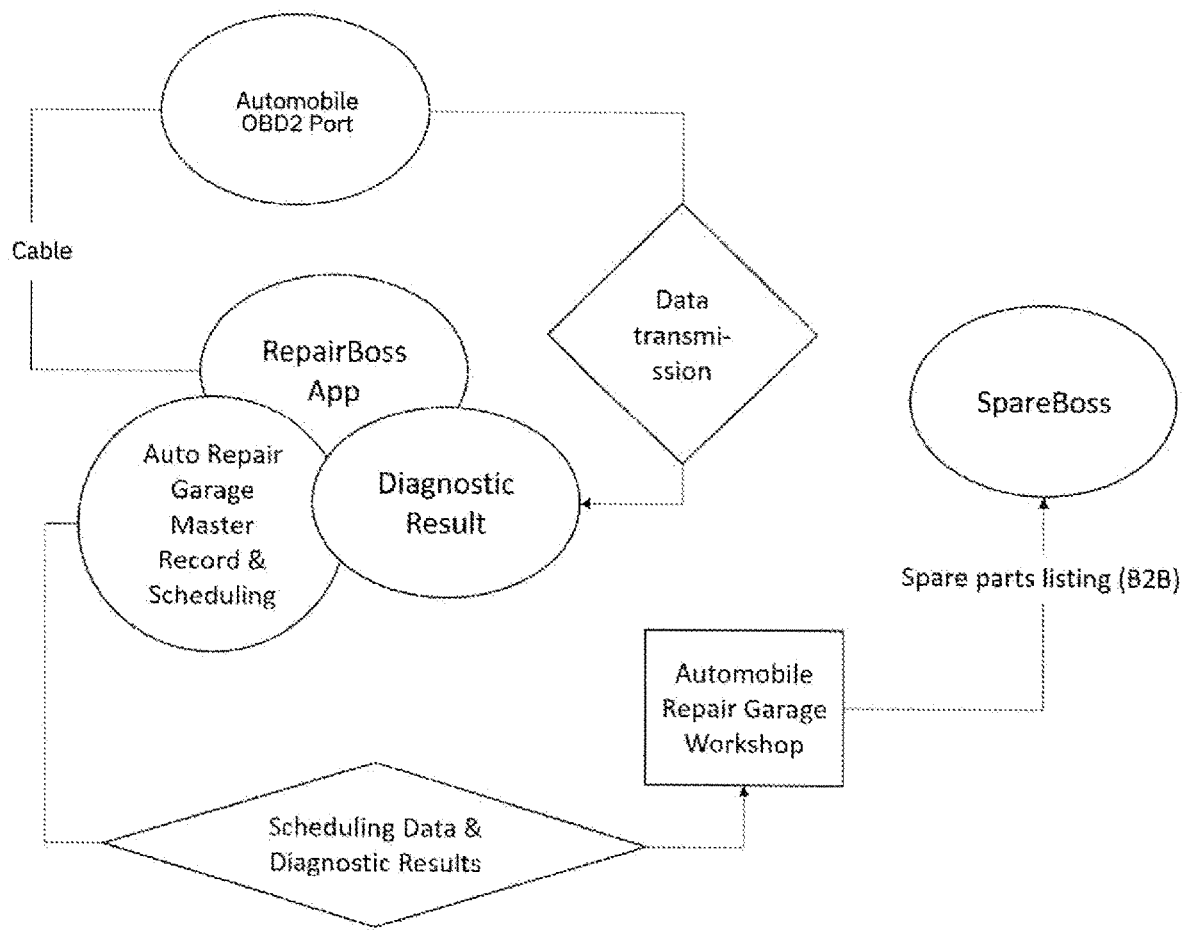

FIG. 3 is a flow diagram showing operation of a RepairBoss platform and a SpareBoss platform, in accordance with some embodiments.

Figure 4:
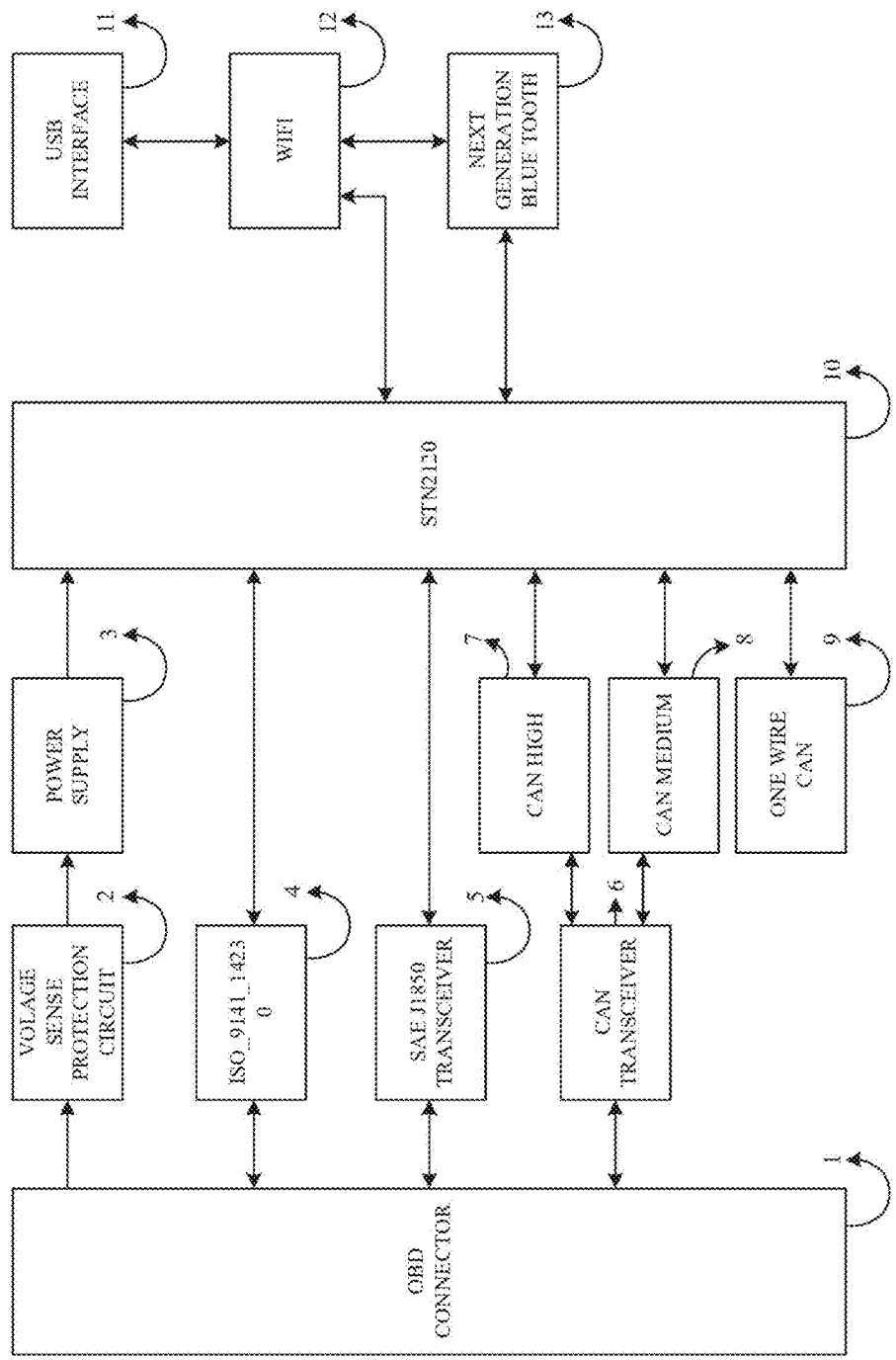

FIG. 4 is a block diagram of entire system of a ScanBoss device, in accordance with some embodiments.

Figure 5:
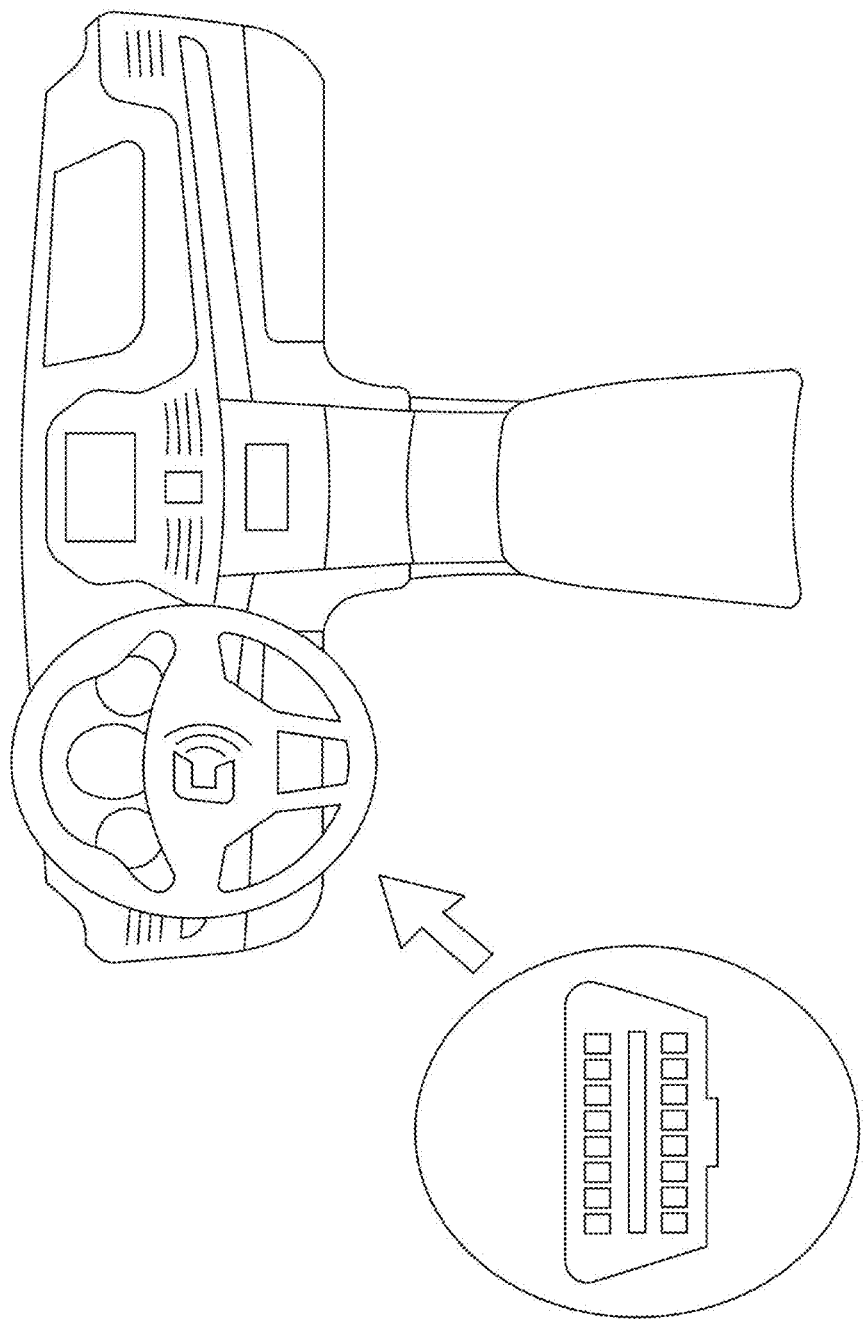

FIG. 5 is a schematic showing the position of OBD-II port in cars, in accordance with some embodiments.

Figure 6:
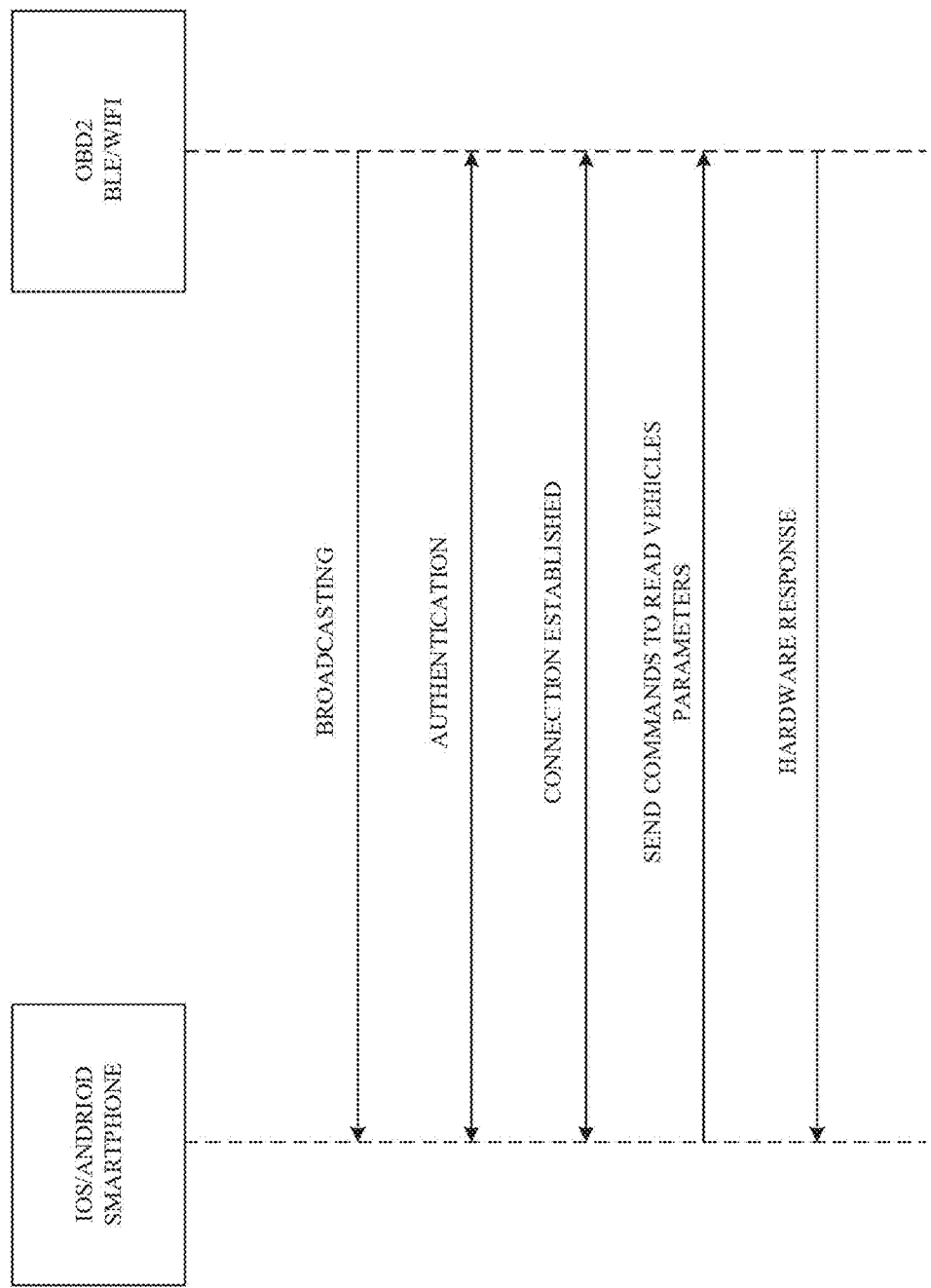

FIG. 6 is a block diagram showing data flow and system check, in accordance with some embodiments.

Figure 7:
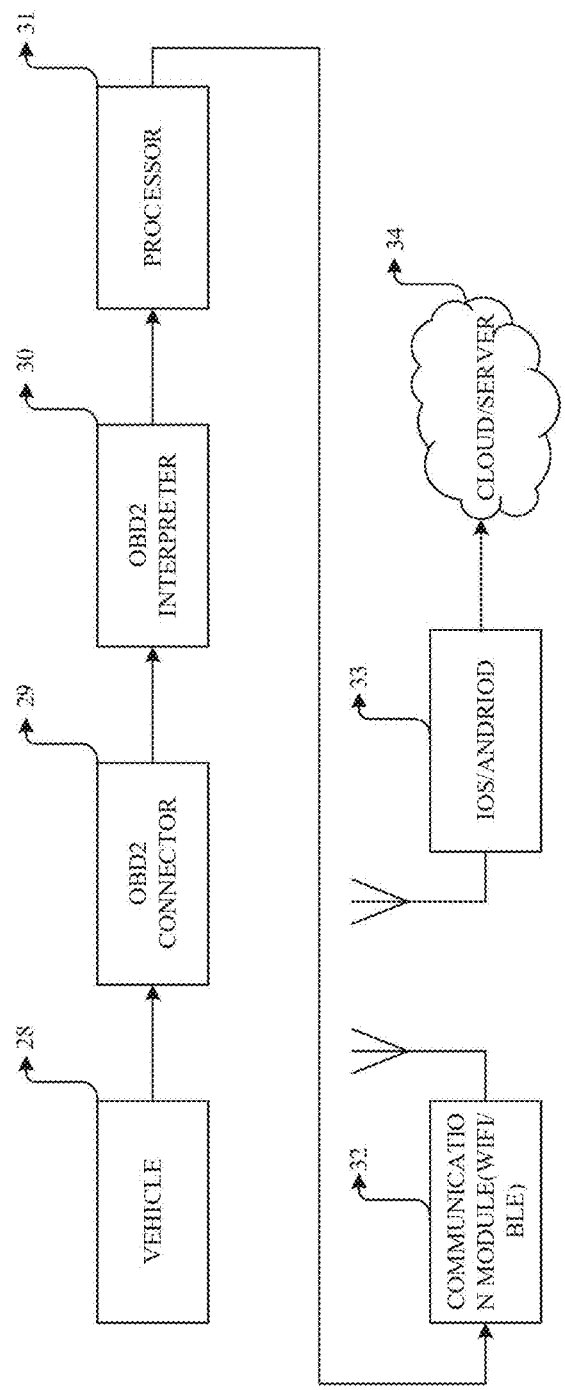

FIG. 7 is a block diagram showing the flow of data from server to mobile communication, and to a hardware system, in accordance with some embodiments.

Figure 8:
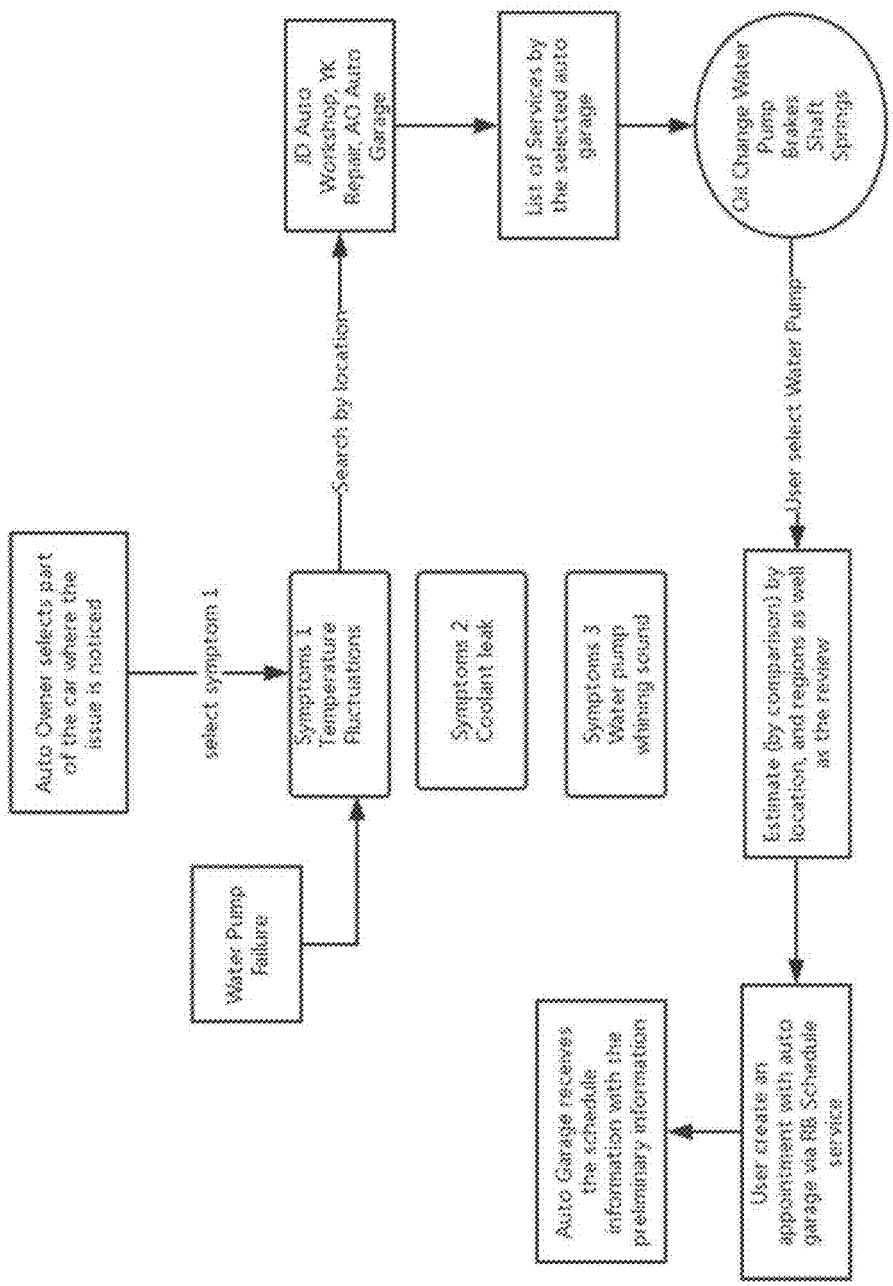

FIG. 8 is a schematic of a method of a RepairBoss platform to facilitate an appointment with an auto garage owner, in accordance with some embodiments.

Figure 9:
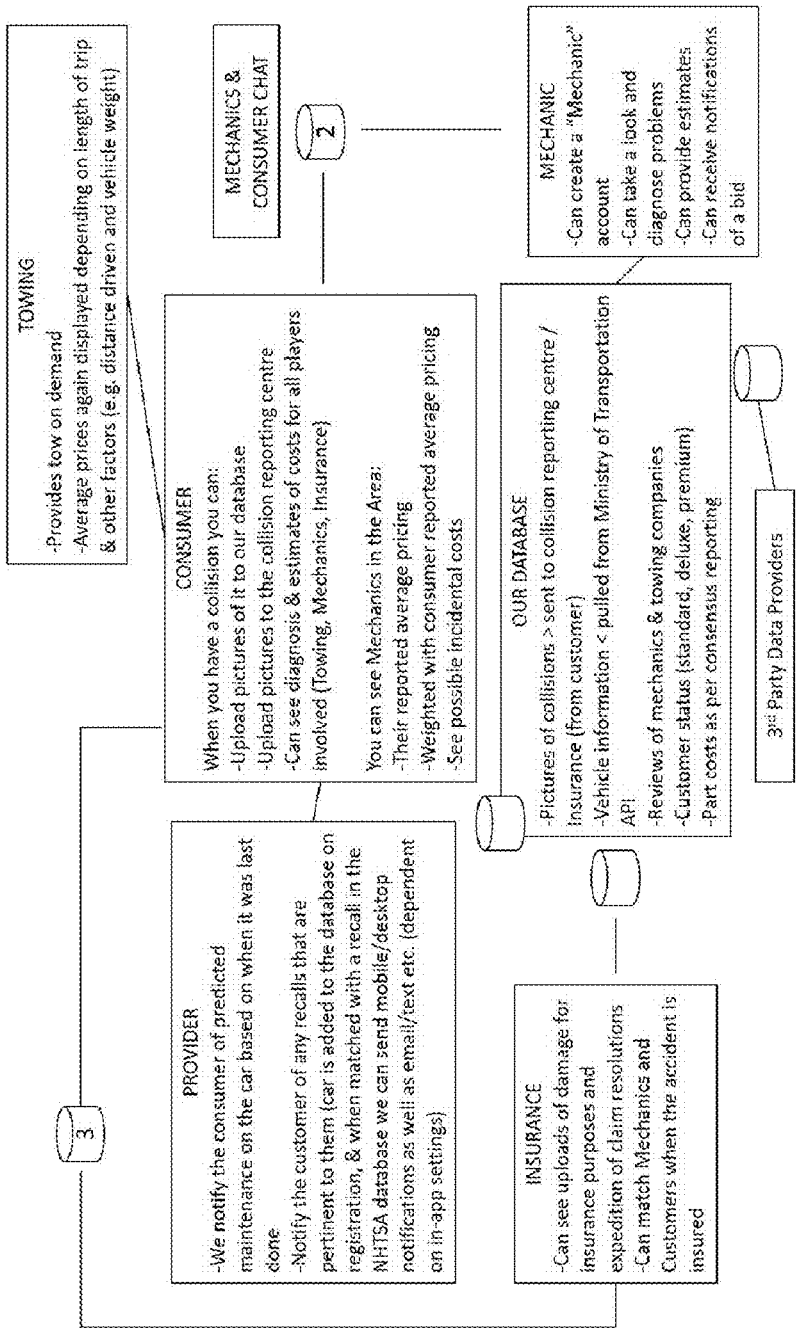

FIG. 9 is a schematic of a RepairBoss platform providing various functions, in accordance with some embodiments.

Figure 10:
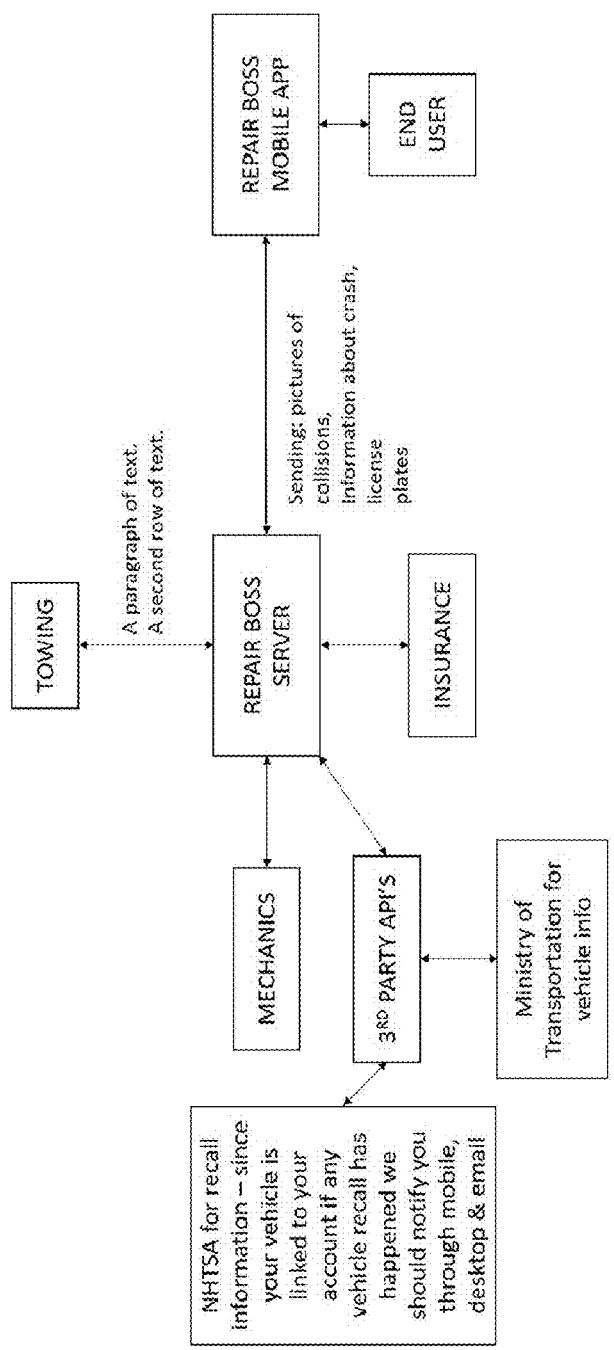

FIG. 10 is a schematic of a RepairBoss platform providing various functions, in accordance with some embodiments.

Figure 11:
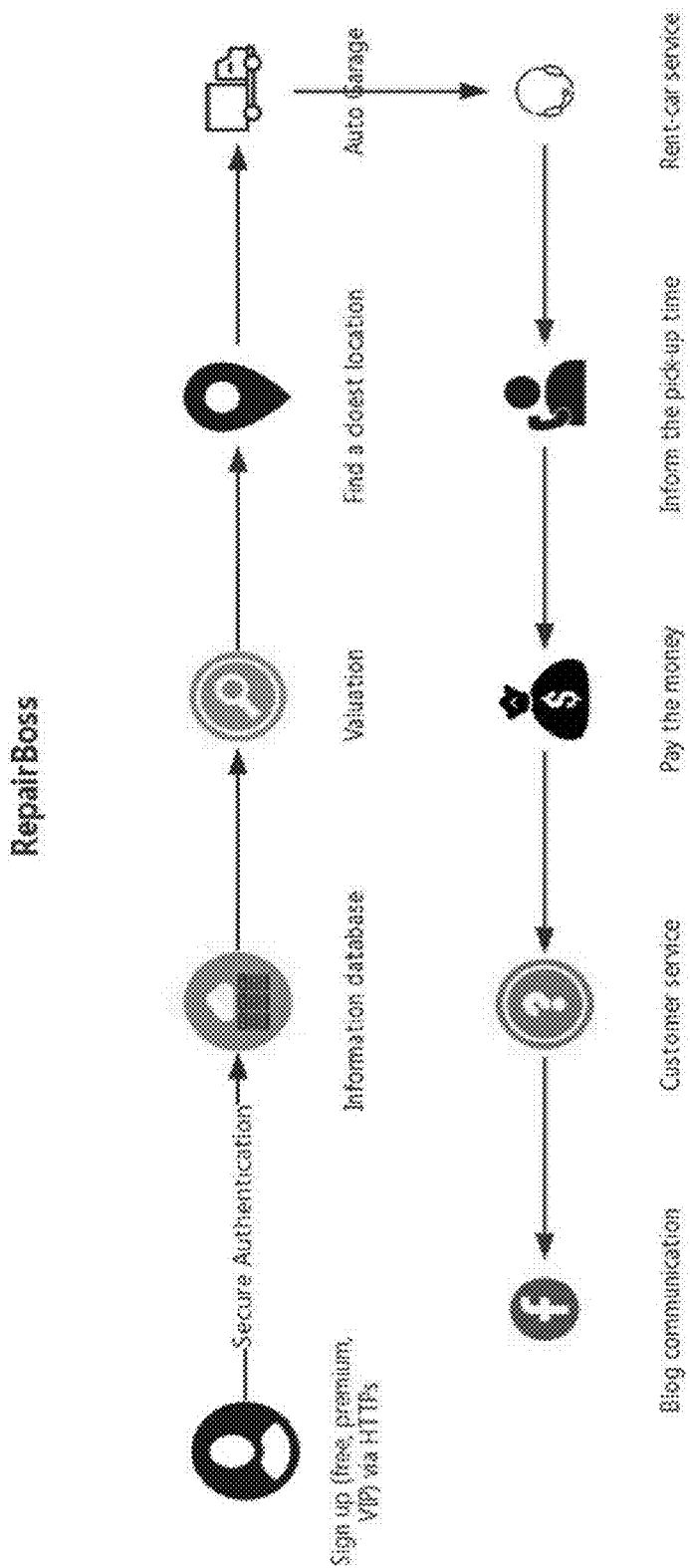

FIG. 11 is a schematic of a flowchart of a method for a RepairBoss platform to facilitate in connecting a user with an auto garage, in accordance with some embodiments.

Figure 12:
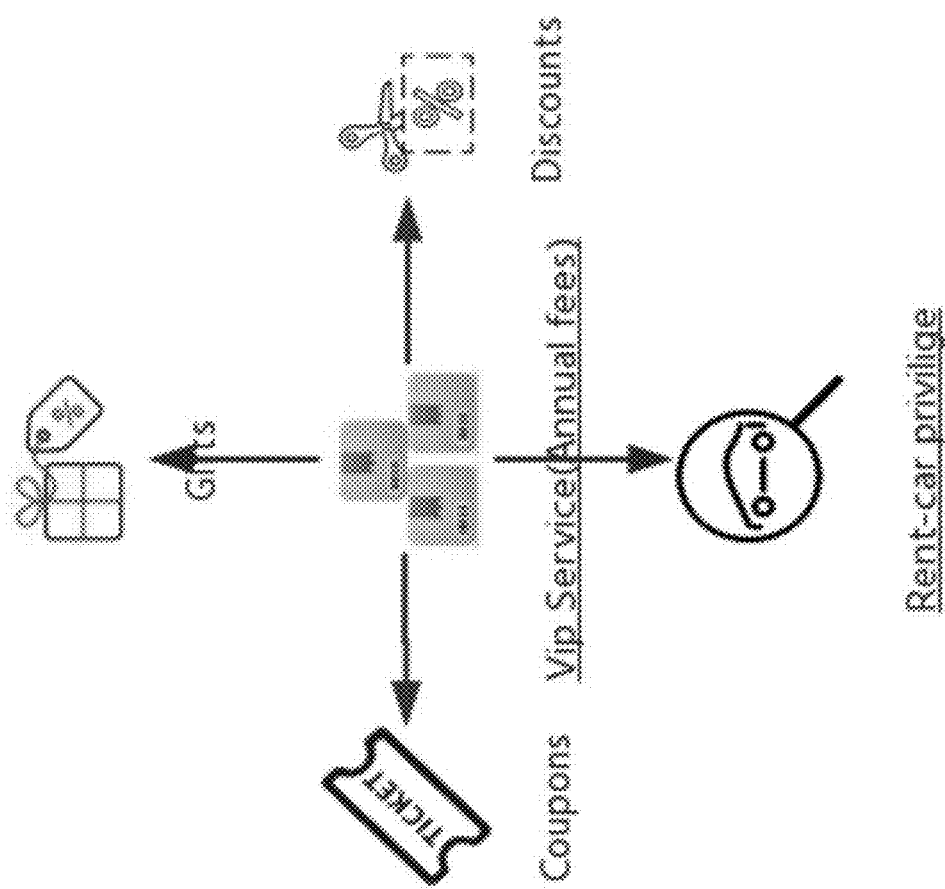

FIG. 12 is a schematic showing VIP services of a RepairBoss platform, in accordance with some embodiments.

Figure 13:
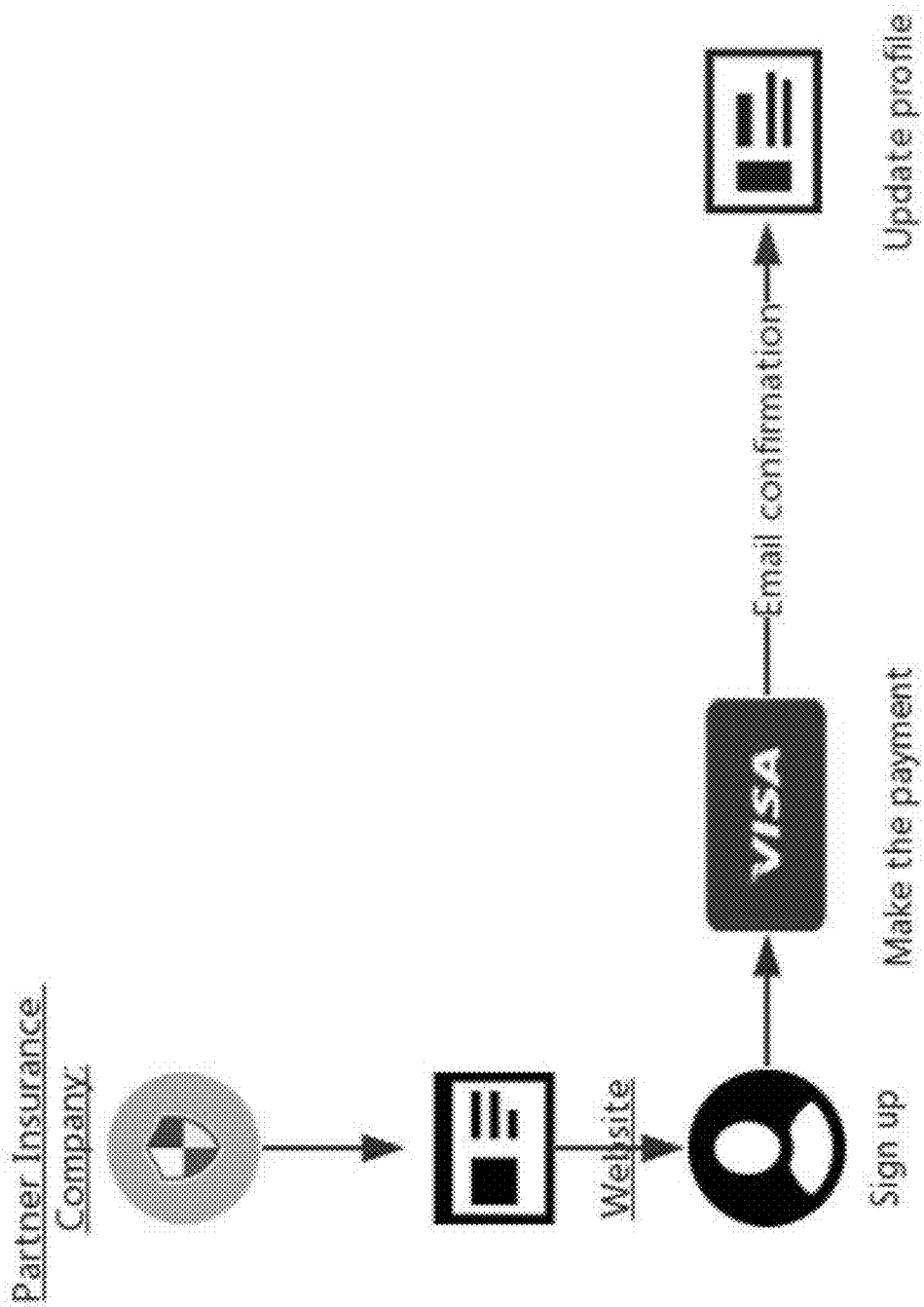

FIG. 13 is a schematic of a method for a RepairBoss platform showing a partner insurance company updating profile, in accordance with some embodiments.

Figure 14:
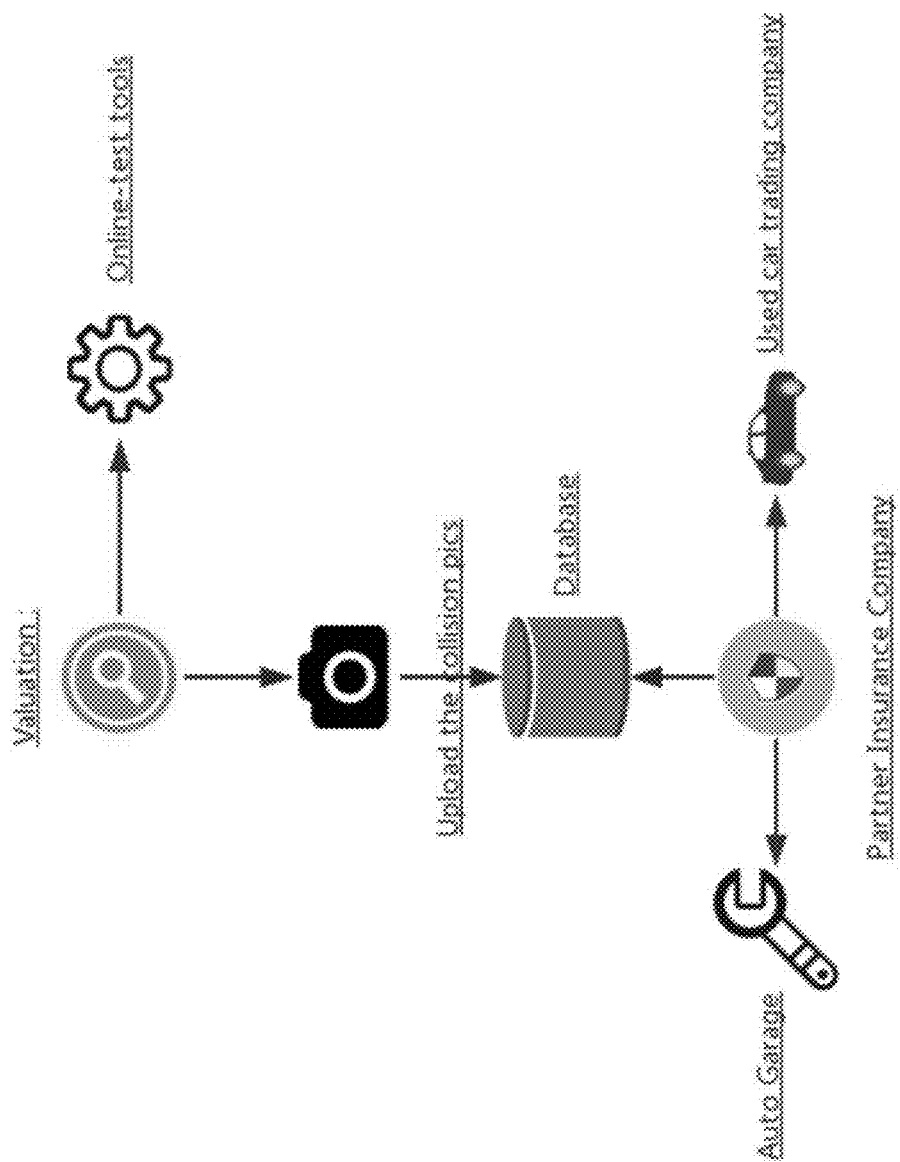

FIG. 14 is a schematic of a method for a RepairBoss platform to determine valuation of a car, in accordance with some embodiments.

Figure 15:
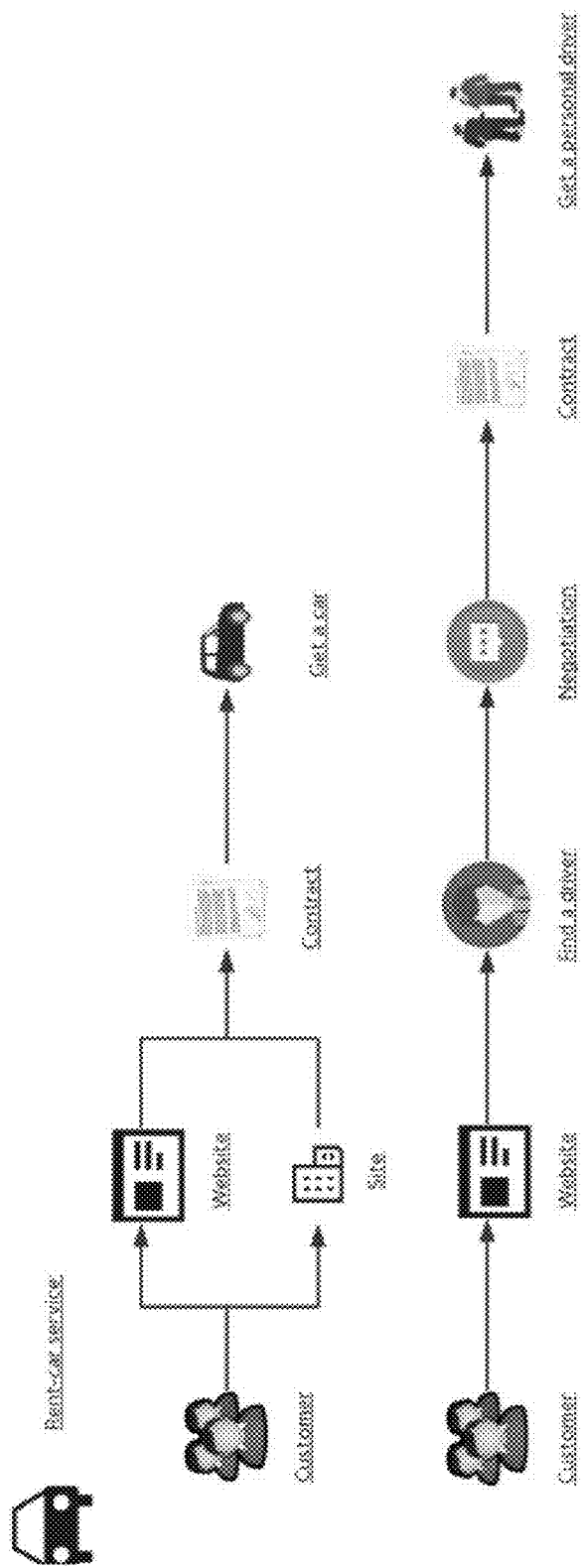

FIG. 15 is a schematic of a method for a RepairBoss platform to rent-car service, in accordance with some embodiments.

Figure 16:
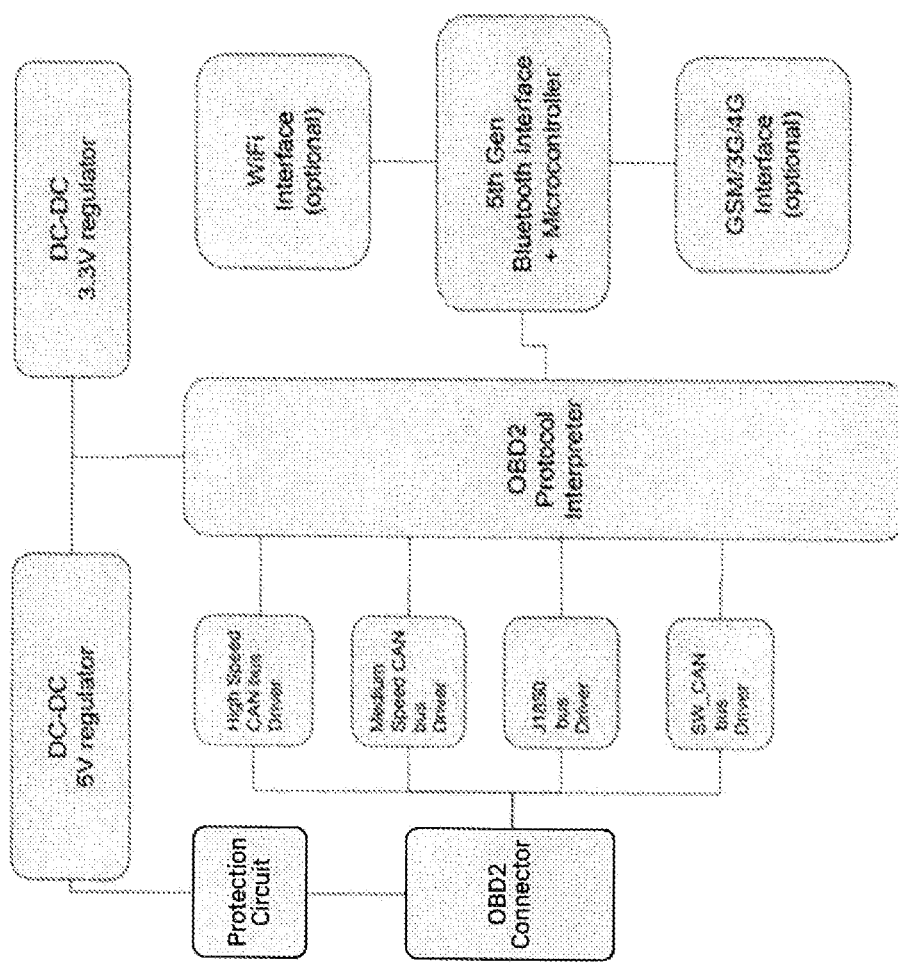

FIG. 16 is a block diagram showing OBD-II protocol interpreter, in accordance with some embodiments.

Figure 17:
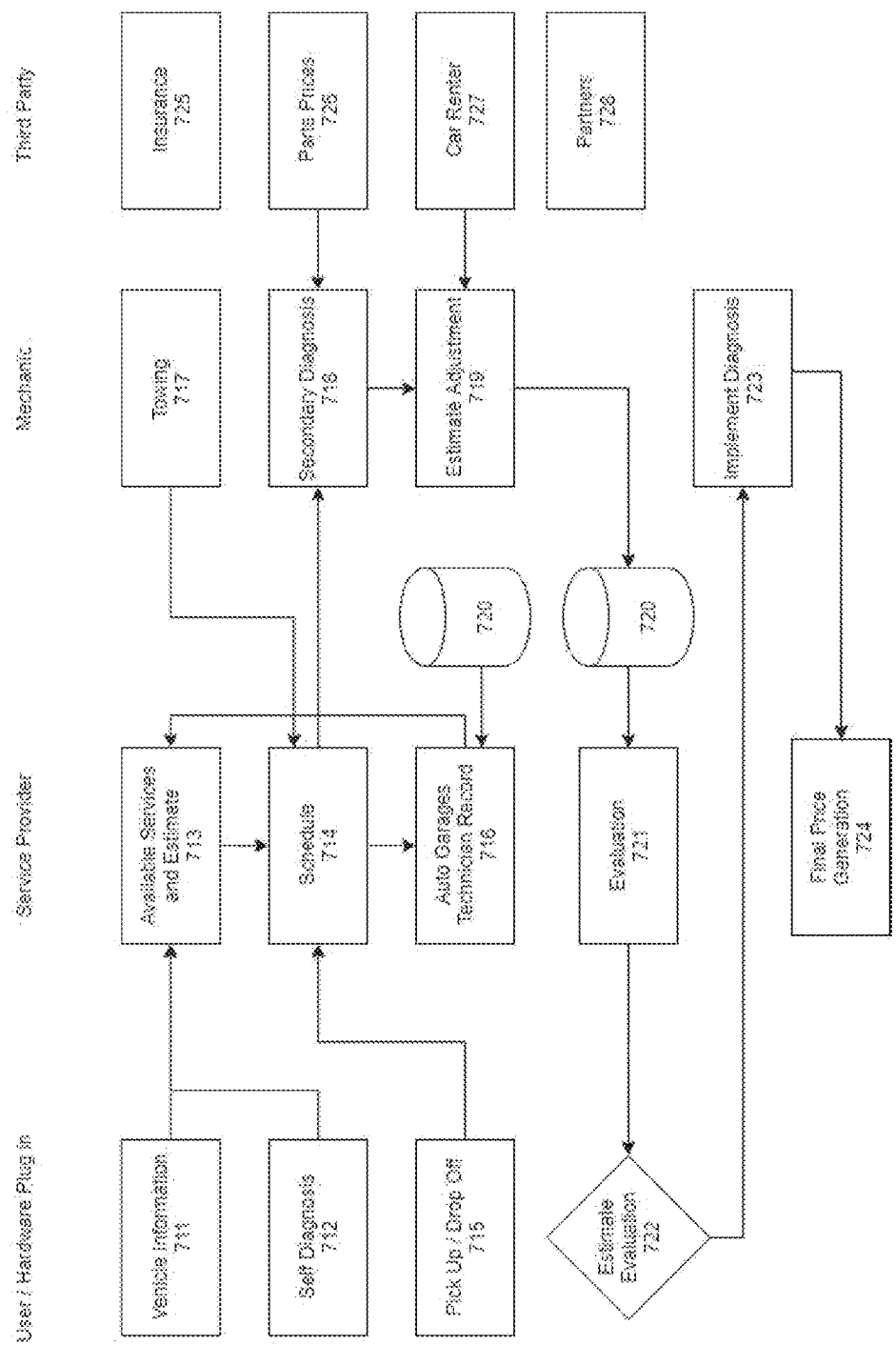

FIG. 17 is a block diagram showing final price generation for the RepairBoss platform, in accordance with some embodiments.

Figure 18:
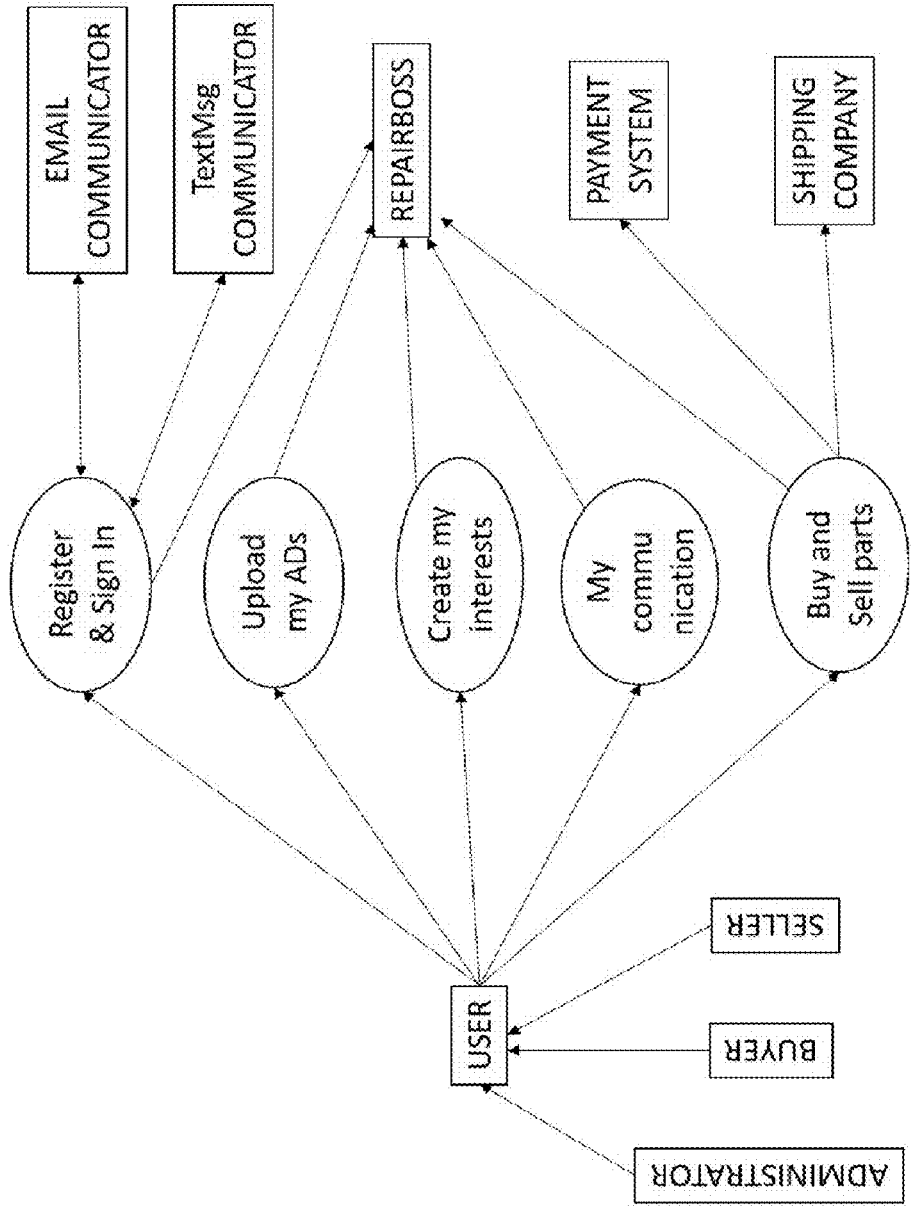

FIG. 18 is a schematic of a flow diagram of the RepairBoss platform showing a top level, in accordance with some embodiments.

Figure 19:
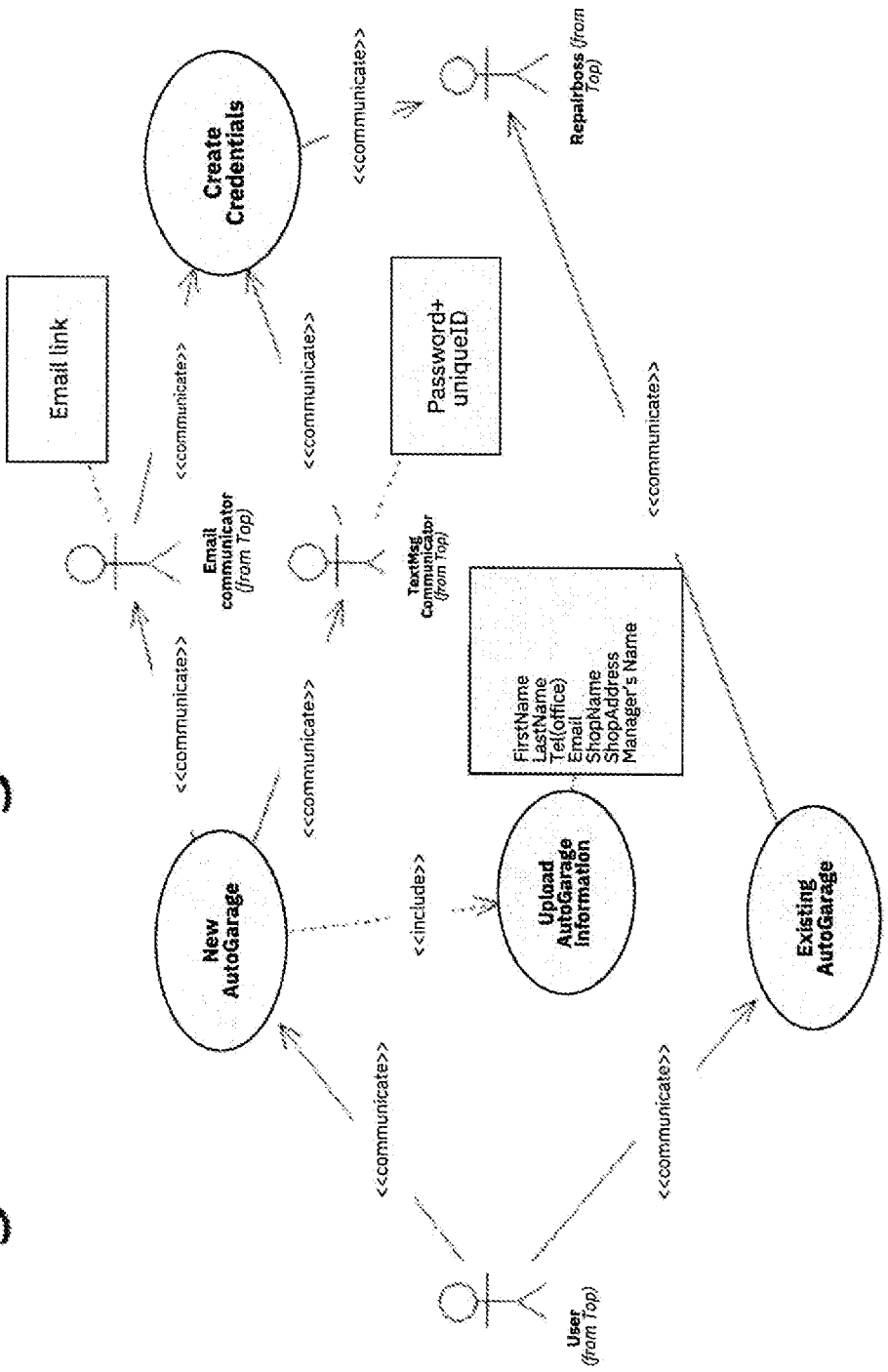

FIG. 19 is a schematic of a flow diagram of the RepairBoss platform showing a register and a sign in process, in accordance with some embodiments.

Figure 20:
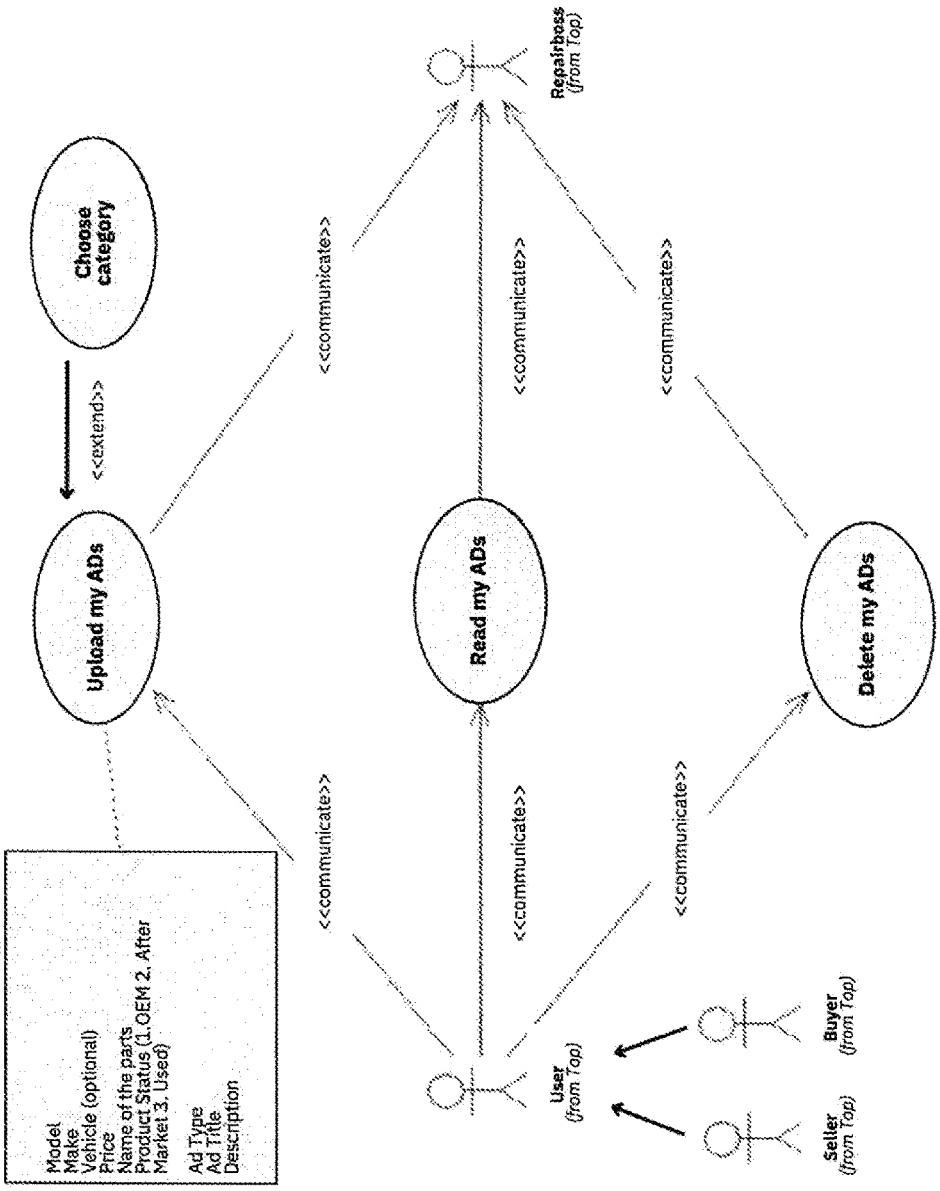

FIG. 20 is a schematic of a flow diagram of the RepairBoss platform showing an upload my ADs process, in accordance with some embodiments.

Figure 21:
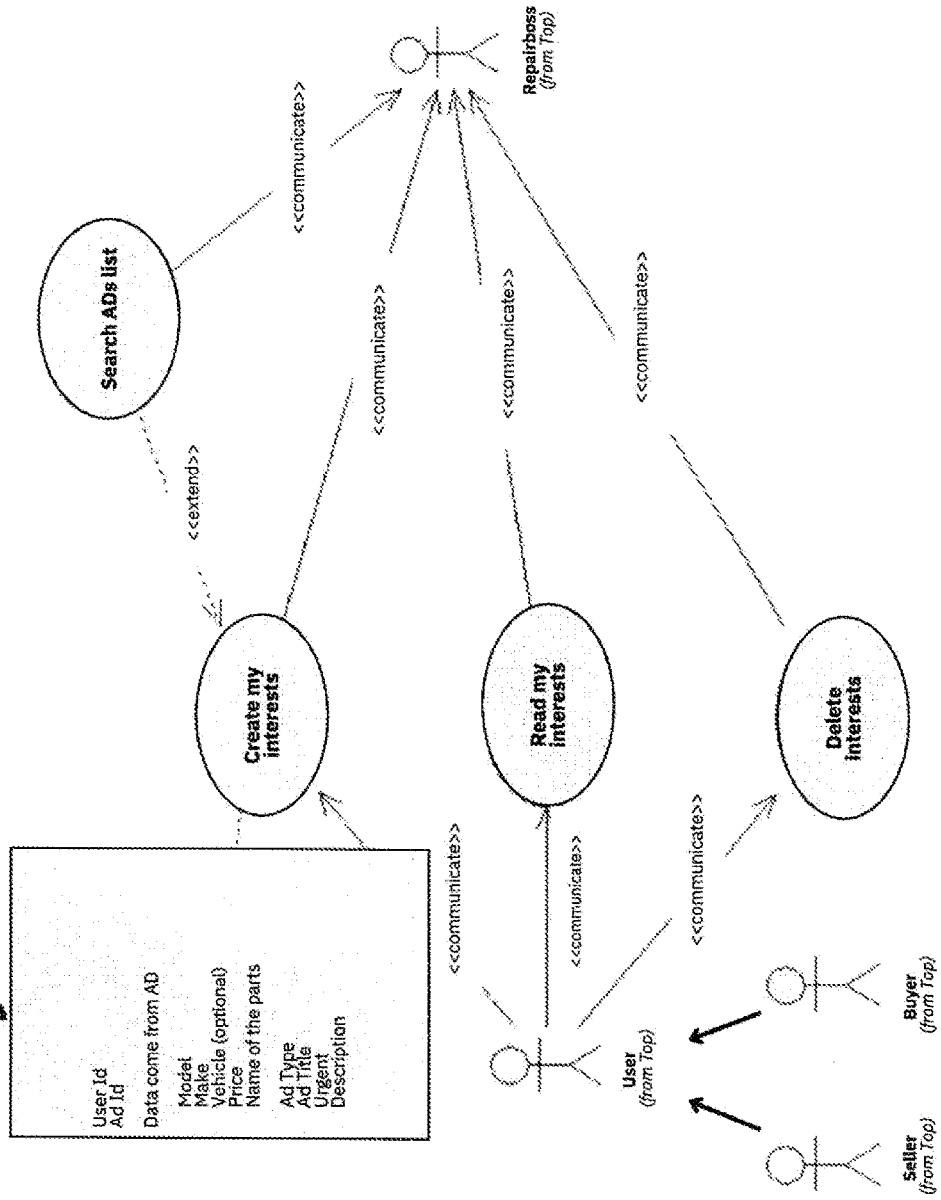

FIG. 21 is a schematic of a flow diagram of the RepairBoss platform showing create my interests process, in accordance with some embodiments.

Figure 22:
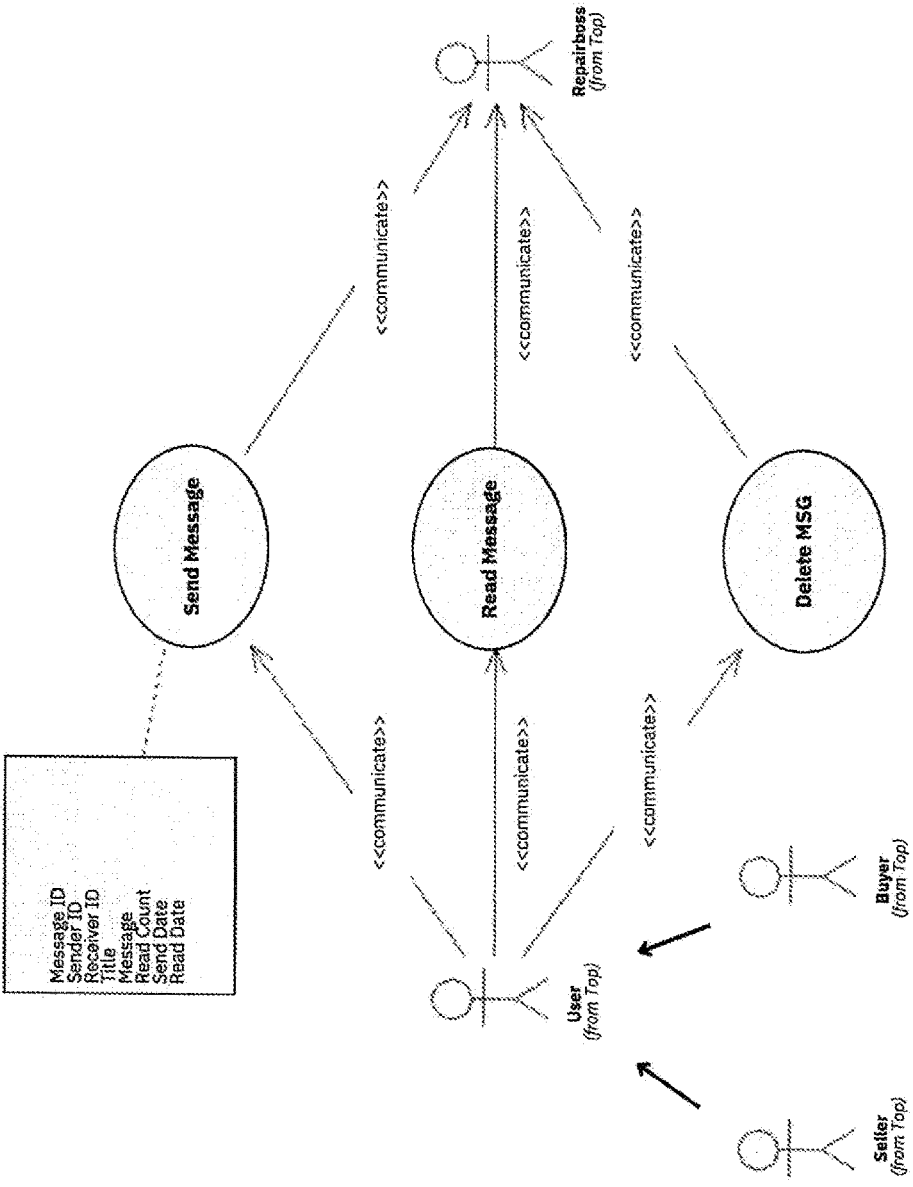

FIG. 22 is a schematic of a flow diagram of the RepairBoss platform showing my communication process, in accordance with some embodiments.

Figure 23:
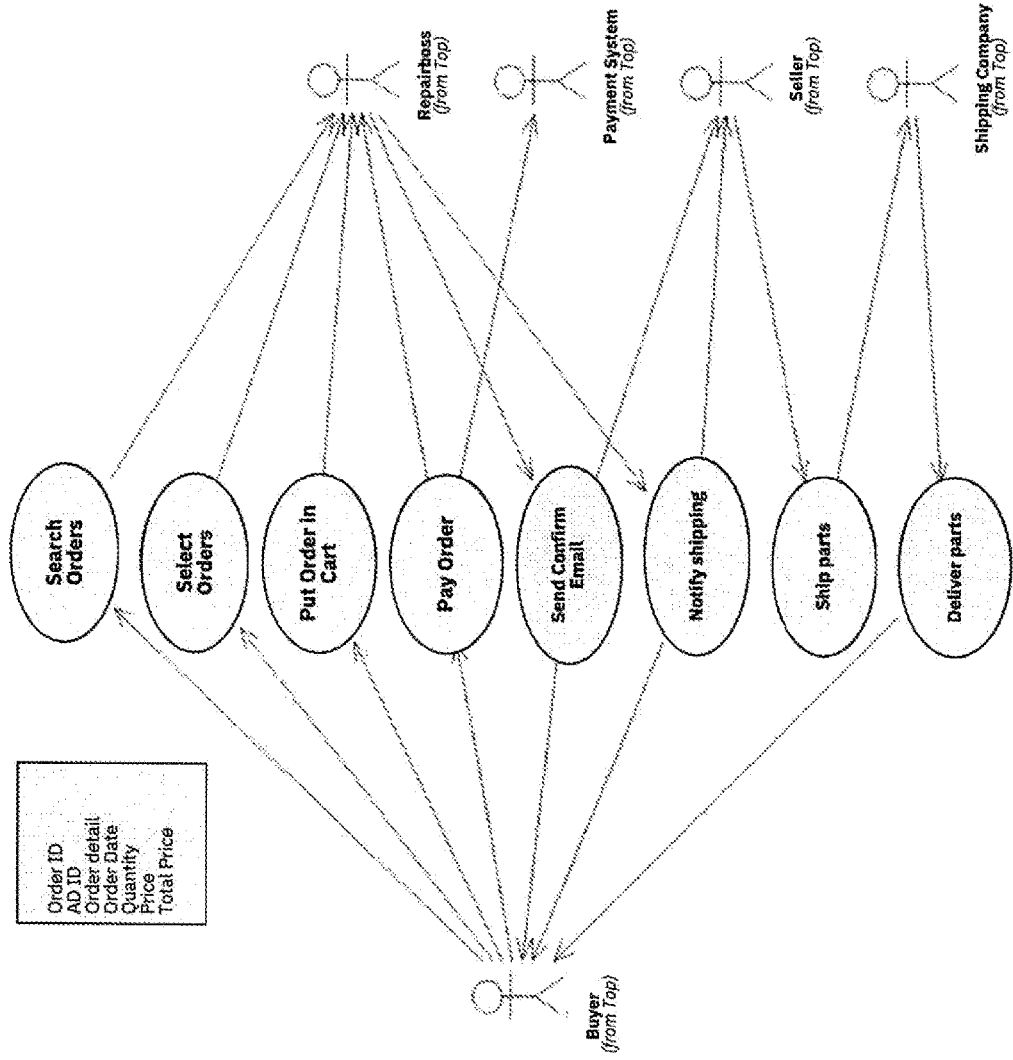

FIG. 23 is a schematic of a flow diagram of the RepairBoss platform showing buy and sell parts process, in accordance with some embodiments.

Figure 24:
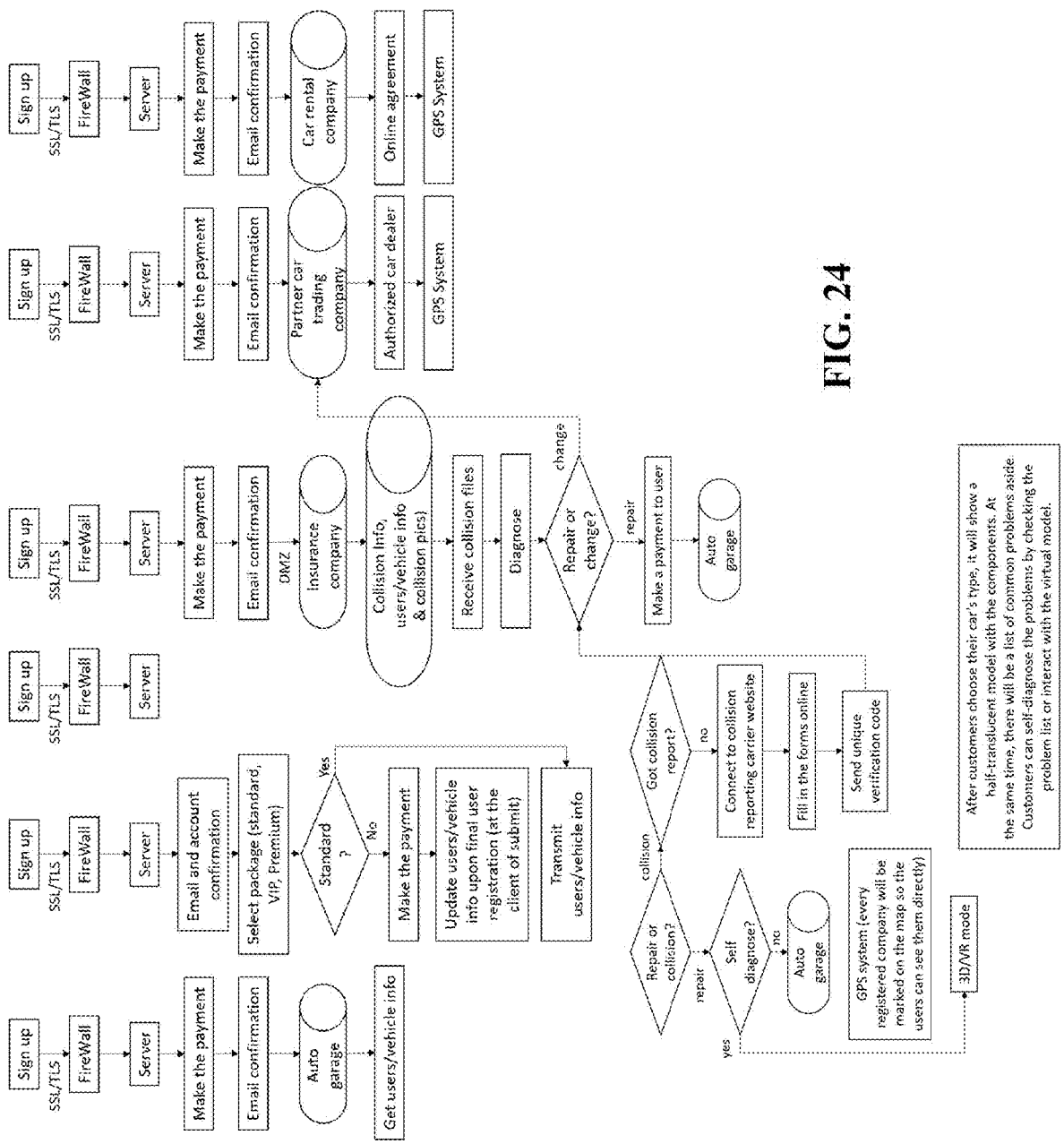

FIG. 24 is a block diagram of a RepairBoss platform for providing 3D/VR model, in accordance with some embodiments.

Figure 25:
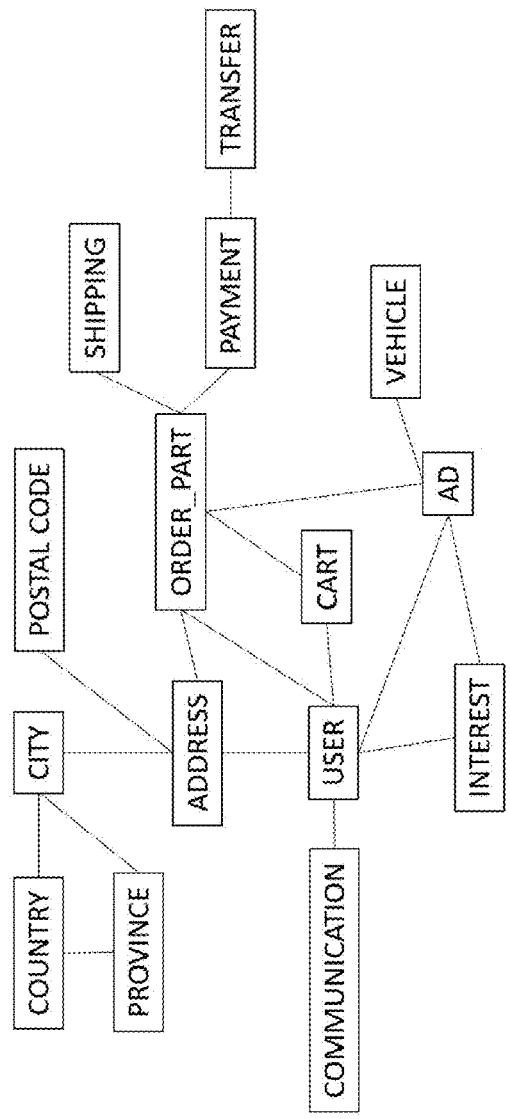

FIG. 25 is a schematic of a RepairBoss platform repair parts database design, in accordance with some embodiments.

Figure 26:
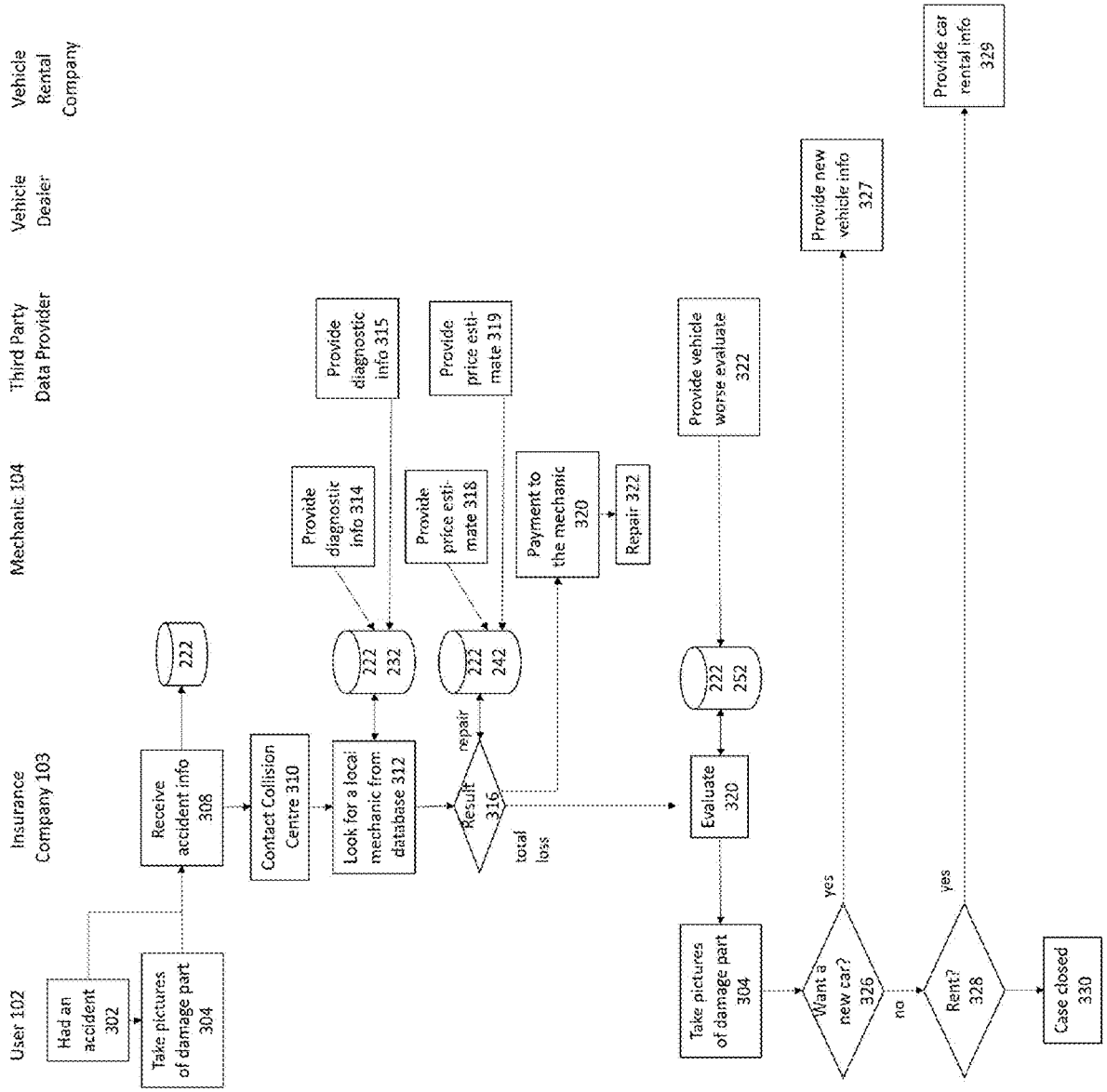

FIG. 26 is a block diagram of a RepairBoss platform providing compensation to a user in case of an accident, in accordance with some embodiments.

Figure 27:
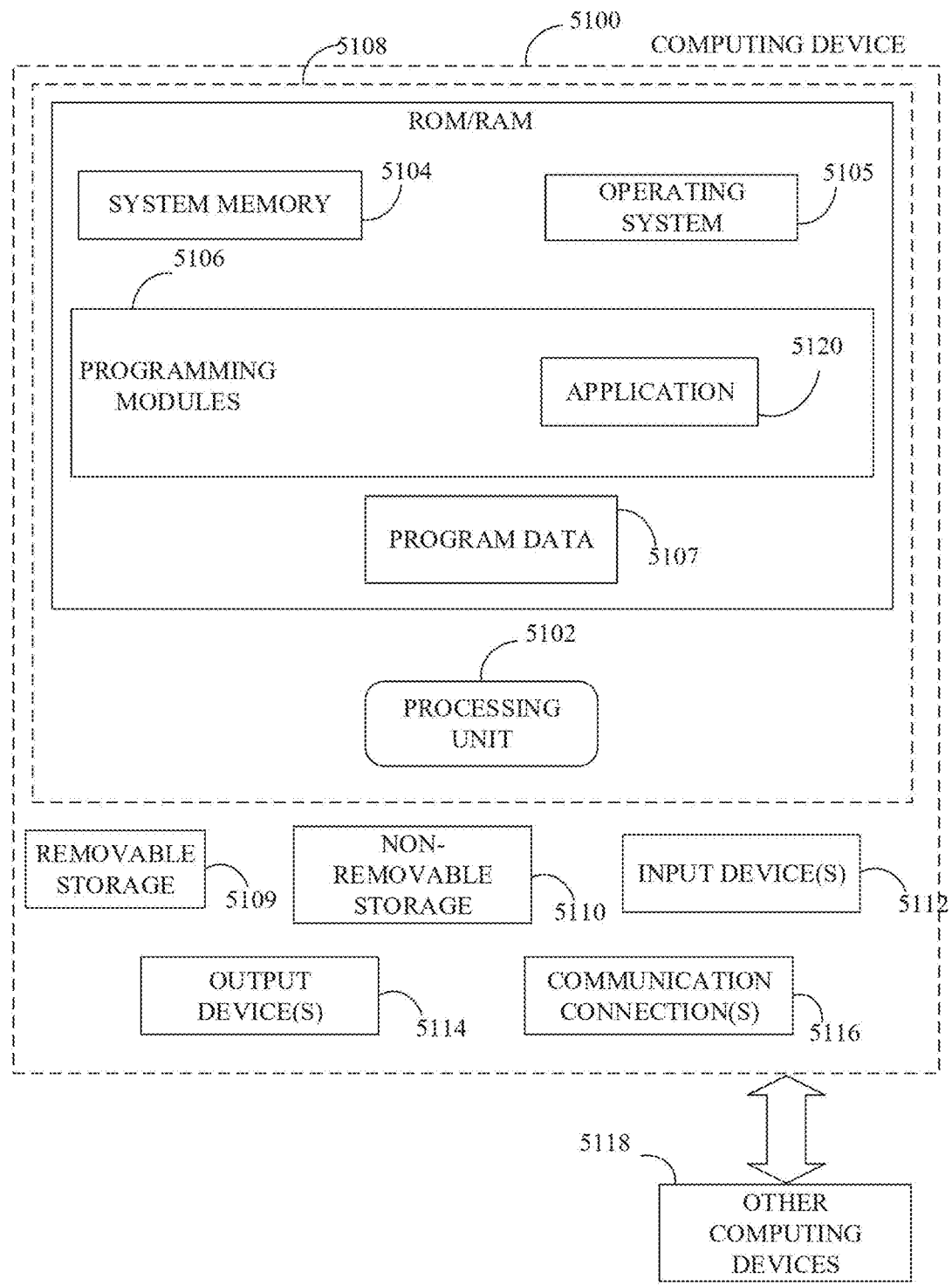

FIG. 27 is a block diagram of a computing device for implementing the methods disclosed herein, in accordance with some embodiments.

Figure 28:
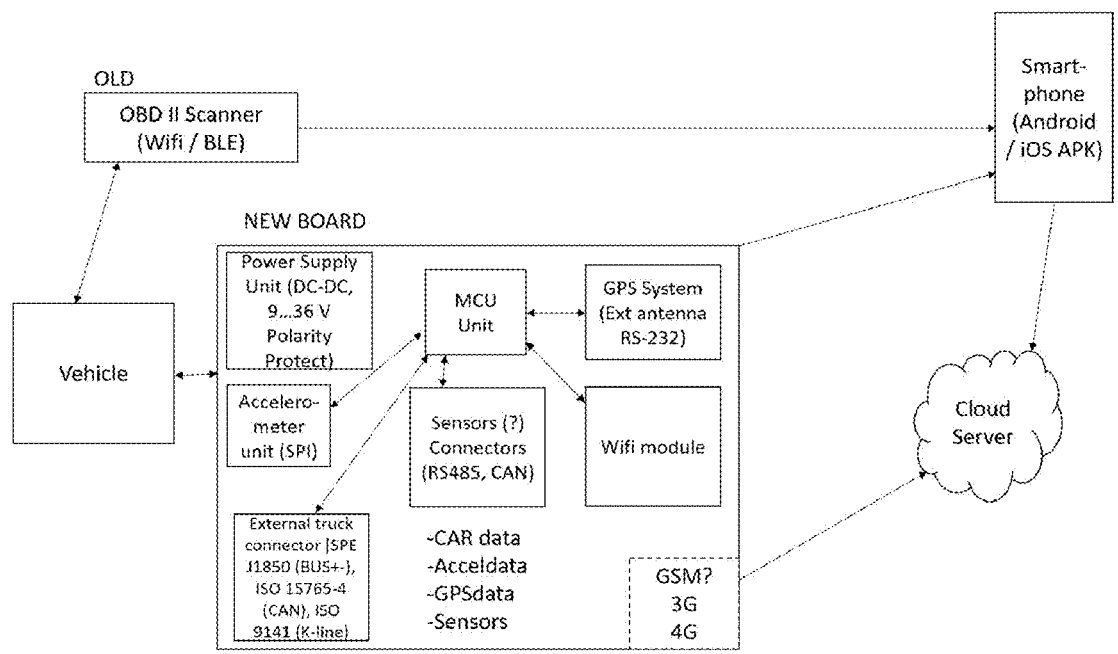

FIG. 28 is a schematic diagram according to an arrangement of the present invention.

DETAILED DESCRIPTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating vehicle related problems, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes systems and methods for facilitating vehicle related problems. The present disclosure relates to a system and method for accessing nearest automotive garage and the average pricing or valuation for selected auto repair, and auto service preliminary assessment system, auto garage dashboard, scheduling tool and auto parts exchange system. More particularly, the present disclosure relates to a system and method for preliminary assessments, average repair valuation, estimated repair duration and repair progress tracking, predictive maintenance, advancing auto service scheduling, repair case management system, auto pick-up and drop-off info system, collision reporting and insurance interface, service selection, and historical service rating of available automobile repair garage nearest to the location of the automobile owner. The present disclosure integrates with other applications including Auto spare parts, and Vehicle Diagnostic system. By wireless or wired networking technology that uses radio waves, the automobile users will have all required information about repair or maintenance needs and tracking, while auto garages would be able to sell spare parts to other auto garages (B2B) or auto owners (B2C), by authenticating their logon to the Repairboss application dashboard to update repair. The information system will be displayed via a user's mobile or digital device such as a mobile telephone, a computer laptop, an iPad, or stationery technology like a computer desktop.

In the face of a challenging economy and stagnant growth, coupled with fast rising cost of living, any savings in the households' economy would reduce the mounting debt obligations by most consumers. The RepairBoss (RB) platform would enable the consumers to get a fair repair estimate through a set of computerized systems that pools comparable prices based on a set of criteria including the postal or zip code, satellite system, algorithms, intelligence, diagnosis, etc.

Many company providers, such as an auto garage, wish to be unceasingly informed of the condition of their customers' vehicles, in order to be able to offer them the right service at the right time; a service the customers might not even know they need. Further, an auto Technician may not have space or time to repair/fix a car, or too busy to attend a car owner. Often, auto users brought their cars to a service shop that may not have enough space to accommodate their repair needs, or too busy to attend to another car. The experience has shown that most Auto technicians would either ask the auto users to bring their car back at a future date or try another Auto technician. This puts pressure on the auto users especially, if the automobile required immediate service.

Auto technicians in some cases, would procure parts that were not included in the original agreement, then call the customers or sent an invoice that appeared miles away from the original estimated price. Consumers, in turn, are often preoccupied with work, family and other live events, which makes it difficult to shop around, They are forced to pay the ominous bills.

Going from one shop to another, or combining different websites, or navigating from one page of auto repair shops to another, or calling different shops in search for a better repair valuation is tedious, onerous and time-consuming. Consumers need a central system that is built with a robust interface and powered by high technologies.

Generally, an automobile that is repaired regularly could have a longer usage life, safe on the road and durable. However, many automobile users are unaware of the critical or important servicing needs that their automobile requires. Delayed repair could cause more wear and tear, and is costlier to repair.

Further, a wrong assessment or inaccurate diagnosis could cost more than the real cost of the repair. Many auto owners are not savvy in the mechanics or electrical of the car, while only few people pay attention to manuals that may be too technical to understand by an average automobile owner. Many automobile owners do not want to be bothered; they just want to drive a hassle-free car. Having a true diagnosis to understand the exact repair needs is critical. How can a Medical Doctor prescribe medication or order surgery on a patient without conducting a thorough diagnosis, multiple tests, and interviews with the patient? A bad diagnosis can affect health outcome. Think about an automobile repair fixing the vehicle brake rotors, while neglecting the brake pads. Proper and effective diagnosis is one of the major concerns of consumers when they bring their automobile to the repair shop.

There have been many cases of auto owners getting a surprised bill from their auto repair workshops, spent time on diagnosis, non-satisfactory repair jobs, bad customer service experience from auto workshops, endless waiting at the repair shop, bogus cost of repair yet, there is no single platform that offers a complete suite of auto repair needs, repair valuation, guaranteed price, free preliminary assessment, case management system for tracking.

Many auto owners lead busy lives either at work, or caring for their children's needs, or attending to aged parents, or participating in crucial social functions, or taking children to extra-curricular activities thus, an electronic device (otherwise called platform) accessible by web and mobile applications would provide the comfort, convenience, and connectivity to verified and qualified auto repair workshop.

Having an emergency button which can send an automated message to emergency contacts, friends, and families could help in critical and dire situation.

A single payment platform that processes the payment for the consumers and enables the repair shops to have a streamlined payment system with printing, downloading, and email functionalities.

Further, having a system that can pick-up and drop-off their automobiles are key to helping consumers to focus on other life activities. The fast-paced nature of North American lives often pose a challenge with timing allocation to other important requirements like bringing their automobile to the repair workshop. The current system provides a platform where the consumers can subscribe to have their automobiles picked up and dropped off.

In a highly competitive market, many repair shops continue to face enormous challenges of reaching customers within their established workshop. The present disclosure would create an automated computer ecosystem that would connect automobile owners with the repair shops in real-time.

The problem with customer service or after-repair service management has been one of the challenges faced by the auto repair shops. This problem often affects the customer service relationship and the loyalty from customers. Complaints on repairs, warranties, and others can be managed directly within the present disclosure.

In the ongoing competitive automotive repair shop market, repair shops look for strategic and effective ways to reduce the overhead cost of operation by eliminating certain fixed or variable costs, whenever possible. The present disclosure offers a platform where customers can interface with their respective technicians by instant messaging, SMS, or email directly through the dashboard system.

Some of the delays that customers often experience with their repair technicians or workshops are due to supply chain and logistics in spare parts ordering and delivery. In some cases, spare parts may not be available unbeknownst to the automobile owner, and even the repair shop. A delay in delivery affects the perception, reputation, and loyalty. The present disclosure offers spare parts integration and provides real-time parts ordering and shipping systems. The present disclosure provides an integration with a custom spare parts inventory, ordering, shipping, and delivery system. The fully automated spare parts system enables the auto owners search parts by vehicle year, make, brand and location, and fully automates with the parts delivery system.

Scheduling or booking an appointment to bring the automobile for a repair sometimes may pose a challenge, especially in the busy season of the year. Many consumers have experienced appointment cancellations, arbitrary change in appointment forced by overlapping schedules. This scheduling conflict puts auto owners at a disadvantage in that they must now find another time to bring their vehicles to the garage for an urgent repair. The present disclosure offers a system where auto owners can schedule an appointment at the click of a button then receives confirmation on their appointment through an auto owner dashboard system.

Having a diagnostic device that can automate the root cause of their vehicle problems then communicates the same to the auto repair workshop has been one of the problems in the industry. The present disclosure is out to solve such friction by sending the diagnostic result of the vehicle problems to the selected auto garage workshop. However, there is yet to be an effective system that connects automobile owners with the automotive garage nearest to their location, the kind of method that provides a complete platform for virtually, all automobile selections.

To put it specifically, automobile users continue to struggle with a huge cost of repair, and sometimes, quality issues. Getting a fair and competitive valuation for auto repairs remain a challenge for most auto users. Unfortunately, there is no system or method that offers a central platform to available auto garage nearby the user's area and the pricing for the repair based on preliminary assessment.

The present disclosure may provide a market place for complete auto repair, maintenance, and collision reporting package, combined with ease of access to qualified and certified automotive technician or garage including their service areas of specialization, preliminary assessment, the average cost of repair, predictive maintenance, self-collision reporting, and insurance-claim accident verification.

The present disclosure is a "connecting economy" whereas automobile users, automotive service technicians, reporting collision centers, insurance companies are able to visit the marketplace (online platform) to schedule a repair, obtain an average cost of repair, and provide service feedback.

The present disclosure may have business partners in insurance companies, collision reporting centers, car trading companies and rental car companies.

The present disclosure provides the medium for auto owners to upload pictures of collision damages to their insurance company with an instant email notification sent to the auto owners.

The present disclosure enables insurance companies to shop for best repair deals nearby the claimants' location. It also provides ease of access to wide range of available auto technicians, their repair rates or valuation, and approximate duration of repair.

The present disclosure has interface with car trading companies where users could trade their automobiles.

The present disclosure has such capability to interface with car hires or personal drivers' service that provides convenience while the automobile is being repaired.

The present disclosure provides system for pick up and drop off after repair.

The present disclosure has the optional feature to select standard, priority, or express auto service package.

The present disclosure has a built-in interface to car rental companies or personal drivers to provide comfort services to automobile users while their car is being repaired or serviced.

The present disclosure includes such service whereas the automobile owners involved in collision or vehicular accident could upload the picture of damages to the platform for repair valuation or insurance review.

The present disclosure includes the list of towing companies, mapped by location, service category and average price.

The present disclosure includes crisis assistance system whereas the stranded auto owners could search available auto garage or technician nearby their location.

Until now, an, average auto owner would consult google finder to identify the list of mechanics nearby their location or visit the Yellow pages or other existing platform. The problem with the approach is, none provides the ecosystem where Auto owners, Auto garages, spare parts, and ecommerce system are integrated to provide a complete automotive repair system. The present disclosure provides a central marketplace where automobile users can have all that is needed to decide on who, where and how their vehicle should be repaired. Essentially, the present disclosure puts the automobile owners behind the front wheel of making decision regarding their auto repair by choosing the right combination of auto technician, pricing and additional comfort features.

All cars and light trucks built and sold in the United States after Jan. 1, 1996 were required to be OBD II equipped. In general, this means all 1996 model year cars and light trucks are compliant, even if built in late 1995. To discover the health of vehicles, solutions known is an On Board Diagnostics (OBD) port to connect to a vehicle system. The solutions known same as those that choose to transfer the data via long range wireless link Such as cellular. Other method communicate the data for processing in a different way, lowering the cost of the interface, some transferring the data collected via a wired connection Such as USB and some via short range connection such as Bluetooth, Wi-Fi or ZigBee, The OBD is an automotive term referring to a vehicle's self-diagnostic and reportage capability. OBD systems give the vehicle proprietor or repair technician access to the error codes initiated by the various vehicle subsystems. Modern-day OBD implementations use a standardized digital communications Receptacle to provide access to real-time data on vehicle control network in add-on to a standardized series of diagnostic trouble codes (DTCs), which allow one to quickly identify failure within the vehicle.

In general Bluetooth enforcement are set to function in a listening manner in order to avoid radio transmissions that can be burdensome on the limited energy available to battery powered devices like a vehicle that is not running. While in this state, an implementation can permit the device to be discover-able. In discover-able mode, the device will react to a request to connect that comes from a device it was mated with. Hence, most commonly one device has to enter a transmission mode in order to initiate a connection process by issuing an inquiry to explore what other Bluetooth radios are in its vicinity. However in the absence of an event to trigger such switch to transmission mode, one device must be all the time in transmission mode consuming energy for constant transmissions. Bluetooth protocol profiles can help mitigate some of these issues. Devices are designed to acquire their power from standard connections from OBD port receive power perpetually preventing them to use power existence as an indicator of ignition. Devices should not impede with normal transactions. The OBD port gives admittance to the multiple control networks of a vehicle. The use of a wireless communications transmission introduces more expectation of unauthorized accession. In the event of Bluetooth protocol, pairing is the basic form of protection known in the system. Because of the significant harm possible in applications like automotive, this defense might not be reasoned as adequate security.

Scanboss (SB): Scanboss is a diagnostic device that reads automobile computerized system to look for errors or auto related problems, then produce the report via an Auto Connecting platform called a Repair Boss. Scanboss primarily does code scanning, error diagnosis, engine light interpretation then links up with the Repair Boss to get the estimate of the repair cost, repair scheduling, nearby garage, and duration. The ScanBoss device includes an inexpensive, user friendly way to determine a vehicle's readiness for emissions testing and if repairs were successful.

Repairboss (RB): RB is an auto connecting platform that connects auto owners with auto repair garages. The platform also provides a repair estimate based on current location of the auto owner using algorithm and artificial intelligence. Besides, the RB offers a scheduling and appointment booking system for auto owners to schedule their next repair at their choice of repair garage. The platform will connect with Rental car companies, collision reporting centers, auto and repair insurance brokers, car detailing shops. It is powered by e-commerce for full payment integration, camera system, SOS button (for emergency contact and location determination).

Further, RepairBoss platform may include following:
Auto Owners may be able to enter their personal and vehicle information (including VIN) on RepairBoss platform. Their vehicle should come out in 3D slow-motion.

The platform may offer an option for the Auto owners to either register on our platform for offers and packages or use the platform as a guest user without the need to register.

Auto Owners may be able to schedule their repair maintenance with the chosen Auto Garage, and received a unique case number or Repair Unique ID Auto owners may be able to diagnose their automobile on RepairBoss platform to get information on their repair needs The platform may offer a capability to lock and unlock a car from the RepairBoss mobile platform. Further, a user may lock and unlock the car using a user device. Further, the user device may include a smartphone, a laptop, a tablet computer, etc.

The platform may offer a capability to track the location of a car from the RepairBoss mobile platform. Further, a user may track the location of the car using the user device.

The present invention will work with Internal Combustion Engine cars as well as Hybrid and Electric vehicles using Electric Vehicle Analyzer, battery usage and general vehicle management features.

Auto owners may be able to enter their postal code to see all available auto garages in their neighborhood.

The displayed list of auto garages should include the services offered by each auto garage, the reviews, the license carried by the garage and their liability insurance.

Auto Owners should be able to track the progress of the repair, and the time to pick-up.

Auto Owners may be able to rent a car while their car is being fixed.

Auto Owners may be able to get an alert/message informing them of their next car servicing Based on the scheduled maintenance recommended by the manufacturer, an alert (by phone and email) should be sent to the auto owner reminding them of the scheduled service, and available auto garages where they can service their automobile.

An alert about winter tune-up should be sent to the auto owners as well, reminding them of the winter season.

Auto owners may have a dashboard where they can check the history of their car repairs by entering their case ID or vehicle, or Auto Garage information.

Auto Owners may be able to see estimated price of the repair based on different regions, locations, or communities.

Cost of repair may indicate the cost of auto parts, and cost of labor separately.

Auto Garage

Auto Garage may be able to set up/register their account with all information about the Auto Garage.

Auto Garage may be able to receive notification of schedules and appointments on their dashboard and integrated into their email server.

Auto Garage may be able to update the RB dashboard with repair information on each customer, including the progress on the car and when the car is ready for a pick-up.

Auto Garage may offer warranty to the service provided to the auto owners.

Auto Garage may be able to receive payment on RB platform.

Auto Garage may be able to pay for their subscription on the RB platform.

Mobile Application—B2B capabilities

Auto Garage may be able to sell their spare parts between shops.

Auto Garage may be able to upload spare parts for sale or submit online requests for spare parts from other shops.

Mobile Apps may be able to aggregate parts for sale from other sites like Kijiji and list it on our Apps for sale. However, the sale should focus strictly on B2B, not B2C.

The Apps may provide capability for electronic commerce and payment medium.

Data Integration Requirements

Integrate with Car makers and brand of cars from say, 1970s to get the 3D design, brand, make of the car.

Integrate with Car spare parts company to get the real-time cost of parts

Integrate with Rental car companies Technical Integration

Integrate with Email server

Integrate with Google Map

Calendar integration

Integrate with average cost of repair site in Canada

Spareboss (SPB): Spareboss is an auto spare parts platform where auto garages can buy and sell OEM, After-Market and Used spare parts. This platform is integrated with shipping companies and powered by e-commerce for full payment of spare parts. It is a bilingual platform and offers procure-to-pay system.

Further, business requirement for the present disclosure may include:

1. Proposed Business State:

A connecting auto repair economy that offers auto owners choices in their repair decisions by aggregating data on the price, spare parts, auto garage, then provides a feature to book an appointment or create a schedule for their automotive services or maintenance. The proposed business offer auto garages more customers which directly and positively affect their revenue, productivity, efficiency and customer retention.

2. Business Requirements:

2.1 Need a Web and Mobile Application for the Proposed System.

Auto Owners

Auto Owners should be able to enter their personal and vehicle information (including VIN) on Repair Boss platform. Their vehicle should come out in 3D slow-motion.

Auto owners should be able to diagnose their automobile on Repair Boss platform to get information on their repair needs.

Auto Owners should be able to schedule their repair maintenance with the chosen Auto Garage, and received a unique case number or Repair Unique ID As a registered auto owner, I should have option/access to different packages available with Repair Boss, so that I can subscribe to the membership As an auto owner, I should have the option to enter my zip code, to have a list of Repair Boss certified automobile repair shops around me.

RepairBoss platform should default to the location of the auto owner when searching for the available auto garage. (e.g. current location).

Auto Owners should be able to track the progress of the repair of the vehicle.

As an auto owner, I should have the option of ETA, to be able to know the pickup time for the vehicle.

As a registered auto owner, I should be able to receive email and text notification, to remind me about the next due service As an auto owner, I should be able to see the reviews of Repair Boss certified auto shops around me.

As a registered auto owner, I should get notification about winter tune up, to get my vehicle winter ready.

Auto Owner should have options to have their vehicles picked-up for repair and dropped-off after repair.

As a registered auto owner, I should have access to dashboard, so that I am able to check the history of my vehicle repairs Auto Owners should be able to rent a car through Repair Boss while their car is being repaired or fixed by the auto garages.

Auto Owners should be able to get an alert/message informing them of their next car servicing.

Auto Owners should have access to Towing truck by location (Phase 2)

The RepairBoss platform should be able to process towing request (Phase 2)

RepairBoss platform should be able to process payment transaction with towing company (Phase 2)

Towing trucks should receive alert and notifications of service requests (Phase 2)

Towing trucks should have a dashboard to receive notifications, just as the auto garage (Phase 2)

Based on the scheduled maintenance recommended by the manufacturer, an alert (by phone and email) should be sent to the auto owner reminding them of the scheduled service, and available auto garages where they can service their automobile.

Auto owners should have a dashboard where they can check the history of their car repairs by entering their case ID or vehicle, or Auto Garage information.

Auto Owners should be able to see estimated price of the repair based on different regions, locations, or communities.

Cost of repair should indicate the cost of auto parts, and cost of labor separately.

As an auto owner, I should be able to get an approximate cost of repair to have an idea about the final cost of repair.

Auto owners should be able to accumulate points through incremental repairs and should be able to claim the points after certain accumulation.

Auto Garage

Auto Garage should be able to set up or register their account with all information about the Auto Garage.

Auto Garage should be able to transfer appointment/repair jobs to other auto garage based on availability.

Auto Garage should be able to have feasibility to the schedule of other auto garage so they could transfer appointment.

Auto Garage should be able to access employment database to hire temp workers.

Auto Garage should be able to post request for workers and be able to select from pull of available workers.

Interested workers should be able to post their resumes in the RB database

Auto Garage should be able to receive notification of schedules and appointments on their dashboard and integrated into their email server.

Auto Garage should be able to update the Repair Boss dashboard with repair information on each customer, including the progress on the car and when the car is ready for a pick-up.

Auto Garage should offer warranty to the service provided to the auto owners.

Access photos uploaded by the customer and receive notification via email or other forms of notification.

Auto garage owner can confirm and schedule appointment with customers and Repair Boss trigger and send notification to customer on scheduled date and time.

Garage owner should be able to receive partial deposit for services that involves ordering new parts in order to avoid challenges associated with "no Show up" cases.

The suggested payment to be proceeded on Repair Boss should be just the partial deposit and payment for spare part purchase between auto garages . . . Payment by Car owner to Auto mechanic should be handed directly to avoid hiccups and possible issues that may occur by performing payment on the platform.

Spare Parts App

Garage Owners would like the Repair Boss to provide a platform for buying and selling surplus or redundant spare part strictly for garage owners. With the following factored:

Business to Business Model

List your surplus parts

Ability to take photos of product and upload them (upload current pictures)

Ability to insert the price of the product, the type, the conditions and description SpareBoss should be able to process payment SpareBoss should handle shipping by using integration method SpareBoss should be able to process shipping from the Auto garage to the buyer SpareBoss should provide option to leave review by the buyer.

SpareBoss should be able to process returns

Options to select warranty on the product

Should indemnify SpareBoss of the authenticity and quality of the product

Should state and label which items have been sold

Take down sold items after 24 hours

History of the sale should exist for 90 days after which should be archived in database Every 30 days refresh the displayed spare part lists, but the system should have capacity to keep the photos in case the Garage owner wants to relist the same product (Click Repost Model)

Process shop to shop payment

Insurance Aspect:

Insurance integration should be taken out of the scope of the project

3. Functional & Non-Functional Requirements 3.1 Functional Requirements 3.1.1 Functional Requirement List Auto Garage should be able to receive payment on Repair Boss platform.

Auto Garage should be able to pay for their subscription on the Repair Boss platform.

Integrate with Email server

Integrate with Google Maps

Calendar integration for allocation of the dates and times for the repair of the vehicles.

integrate with average cost of repair site in Canada.

"The auto owner can check the history of vehicle repair, by entering either of the following information
Case ID
Vehicle Information Number
Auto Shop Name"

Auto Garage Owner Should Get a Unique ID at the time of initial registration with the Repair Boss Application.

While extracting the reports the Auto owners should provide valid credentials that would include Case ID, Last Name, Contact No or by Auto Garage Name While extracting the reports the Garage owners should provide valid credentials that would include VIN number, License plate number or by the Case Id issued to the vehicle for repairs. 3.2 Non-Functional Requirements (if Applicable) (System Performance/Scalability/Availability)

3.2.1 Non-Functional Requirement List

The platform should offer an option for the Auto owners to either register on our platform for offers and packages or use the platform as a guest user without the need to register.

As an auto owner, I should be able to see the services offered by the RB certified auto shops around me.

3.4 Reporting Requirements (if Applicable)

3.4.1 Reporting Requirement List Auto Owners:

The Auto owners can access their repairs reports and documents history for maximum of a year (one year from the application) but the record for the same will be kept for a period of three years (exclusive of the previous 1 year)

Garage Owners:

The garage owners can access their repairs reports and documents history for maximum of a year (one year from the application) but the record for the same will be kept for a period of three years (exclusive of the previous 1 year)

Integration Requirements:

The platform should integrate with Car rentals, Uber™ drivers, Lyft™ drivers, towing trucks, (insurance and collision center—optional)

3.5 Security Requirements (If applicable)

3.5.1 Security Requirement List

The Passwords Should Be (At least 8 characters, 1 Upper case, 1 lower case, 1 symbol).

Confirm Password Should exactly match the Password Mentioned by the user.

The user gets and alert message that states the security requirement to reset the password every 90 days of the account on the repair boss application.

Two Factor Authentication needed at the time of registration by both the car owners and the auto garage owners.

There should be a session timeout after the system is left idle for 5 minutes after which the user should log in again with valid credentials.

there should be a separate payment gateway in order to accept payments through the repair boss application.

the cookies cannot access or track the information provided by the auto owners and garage owners provided at the time of registration on the repair boss application.

The Repair Boss application should be totally protected by the secured socket layer i.e. https.

The registration procedure should contain 3 security questions and answers that would be vital for retrieving the account in case of any circumstances of forgot password and username by the user and the garage owners.

3.6 Technical Requirements (if applicable)

3.6.1—There should be a high availability server separately used for the repair boss application The server should have the hard drive of 10 Terabytes as hard drive it should also have a memory of 5 terabytes the server should also be a switch over server of it should have a Fail-over system The Server should be a backup server with a real time update The server should have the ability to give 24/7 performance 3.7 Internet Requirements (If applicable)

3.7.1—The Application can be accessible by various web Browsers.

Google Chrome

Internet Explorer

Mozilla Firefox 3.8 Database Requirements (if applicable)

3.8.1—The Database Requirement for the Repair Boss Application are

Scalability

Flexibility

Transparency

Adaptability

Accessibility 3.9 Customer Relationship Management (if Applicable)

3.9.1 Auto Owners:

The auto owners should be able to post their queries on the assistance page of the application which would require some credentials before the auto owners could post their query successfully.

Auto Owners should accumulate points and be able to redeem points

The Credentials that would be required is Case ID after which other personal information will auto fill like address, contact No, Name The auto owner should choose from the list of various queries and then mention a brief description regarding the same.

If the auto owner selects other as an option the auto owner should be able to type the query manually.

After clicking the submit query button a screen message should appear regarding a successful query submission and a notification should be sent regarding the query to the authorized personnel or parties for instant action on the submitted query.

Garage Owners:

In order to post a query, the garage owner has to enter the unique ID that has been assigned during the initial registration with the Repair Boss Application After entering the unique Id, the other related information related to the garage owner would fill automatically the garage owner then can write the query and a brief description related to it and then submit the query.

After clicking the submit button a screen messages should appear regarding a successful query submission and notification should be sent to the appropriate party for instant action on the submitted query.

Success Criteria What marks the end of the use case?

Example: The use case concludes when the card is taken out of the slot.

Exceptions Describe any anticipated error conditions that could occur during execution of the use case, and define how the system is to respond to those conditions.

Example: ATM machine is not in working condition. ATM machine should be repaired and then tested for the use case.

Further, the RepairBoss platform may include auto mechanic features and criteria:

Feature: FORGOT USERNAME 25.1 As a Registered Auto Mechanic, I want to have the option for Forgot Username so I can get my username in case I forget it 25.1.1) On the login screen the user should have the option of "Forgot Username"
25.1.2) When the user clicks on Forgot Username, the user will be navigated to "Forgot Username" screen
25.1.3) The user will see the message, "Please enter your registered email address to retrieve the username"
25.1.4) A textbox will be presented, where the user can enter the email address and submit it.
25.1.5) On clicking Submit, the user will see a message "We have emailed you the username, please check your email"
25.2) As a registered auto mechanic, I want to have the option to resend the forgot username, in case I do not receive it
25.2.1) On clicking Submit, the user will see a message "We have emailed you the username, please check your email"
25.2.2) The user will also have the option to resend the email containing forgot username, in case user does not receive it at first Feature: FORGOT PASSWORD
23.1) As a Registered Auto Mechanic, I should have the option of "Forgot Password" so that I am able to receive a temporary password
23.1.1) On the login screen the user should have the option of "Forgot Password"
23.1.2) When the user clicks on Forgot Password, the user will be navigated to "Forgot Password" screen
23.1.3) The user will have to enter a valid user name and a valid registered email address
23.1.4) On clicking Submit, the user will see a message, "We have emailed you a temporary password and a link to reset the password"
23.2) As a registered auto mechanic, I want to have the option to resend the forgot password in case I do not receive it
23.2.1) On clicking Submit, the user will see a message, "We have emailed you a temporary password and a link to reset the password"
23.2.2) The user will also have the option to resend the email containing forgot password in case a user does not receive it at first
23.2.3) Only the latest sent out temporary password will be valid.

Further, the RepairBoss platform may include auto owner features and criteria:
  able to enter my personal details to create my profile, so that I don't need to enter them everytime when I use the services provided by repair boss
  As a registered auto owner, I should be able to enter my vehicle details on RB, to see a 3D image of my vehicle
  As a registered auto owner, I should have option/access to different packages available with RB, so that I can subscribe to the membership Feature: AUTO SHOPS AROUND ME AND THEIR SERVICES
  As an auto owner, I should have the option to enter my zip code, to have a list of RB certified auto shops around me.
    The list that is displayed on doing a search by zip code should also include services offered by the auto shops
  As an auto owner, I should be able to see offered by the services offered by the RB certified the auto shops around me.
  As an auto owner, I should be able to see the reviews of RB certified auto shops around me.

Feature: REPAIR STATUS AND PICK UP
  As an auto owner, I should be able to track the repair progress of my vehicle, to be able to know the repair status of my vehicle
  As an auto owner, I should have the option of ETA, to be able to know the pickup time for the vehicle.

Feature: NOTIFICATION FOR NEXT SERVICE OR TUNE UP
  As a registered auto owner, I should be able to receive email and text notification, to remind me about the next due service
  As a registered auto owner, I should get notification about winter tune up, to get my vehicle winter ready
  As a registered auto mechanic, I should be notified about the manufacturer recommended service, so that I can schedule the recommended maintenance service
  As a registered auto owner, I should get a list of RB certified Auto Shops around me, so that I can schedule the next due service with one
    The email notification for the next due service should also include details of the garages available near me, who can do the service for my vehicle's make and model Feature: AUTO OWNER'S DASHBOARD
  As a registered auto owner, I should have access to dashboard, so that I am able to check the history of my vehicle repairs
    The auto owner can check the history of vehicle repair, by entering either of the following information: 1. Case ID, 2. Vehicle Information Number, 3. Auto Shop Name Feature: COST OF REPAIR
  As an auto owner, I should be able to get an approximate cost of repair to have an idea about the $ amount.
    Cost of Repair should include two components: 1. Cost of Parts; 2. Cost of Labor
  As an auto owner, I should be able to get estimate of repair cost in different regions or localities.
    Auto owner should be able to have an idea about the repair charges in different locations, localities or regions.

Further, the RepairBoss platform may include mobile application features and criteria:

Feature: ACCOUNT CREATION
  As Auto Shop owner, I should be able to register with RepairBoss mobile application (RBMA), so that I can have an account
    "Register"
    Email Address:
    Owner's Name:
    Auto Shop's Name:
    Phone 1: (mandatory)
    Phone 2: (optional)
    Address: (mandatory)
    Zip Code: (Mandatory)
    Password: (At least 8 characters, 1 Upper case, 1 lower case, 1 symbol)
    Confirm Password: (exactly match the Password)
    Register
  As Auto Shop owner, I should be able to receive email notification from RBMA, to confirm the successful account creation
    The email notification will be sent to the email address provided in the registration form by the auto shop owner. The email notification will confirm the account creation.

As Auto Shop owner, I should be able to sign in to RBMA, to access my account
  The user should be able to sign in with valid credentials (email and password)
Feature: RBMA BUYER
As a buyer, I should be able to access the mobile app to search the item I want to buy
As a buyer, I should be able to see the photos of the items corresponding to my search with their prices
As a buyer, I should be able to tap the photo to navigate to the details screen
  Description of the product, Different Photos, Seller details, Seller Zip code, Posting Date, Price
As a buyer, I should be able to send the seller a message to know more about the product
As a buyer, I should be able to place a call to the seller to know more about the product
As a buyer, I should be able to pay online, to buy the product
As a buyer, I should have the option to choose a delivery method, to be able to inform the seller of the delivery method
  Two radio buttons; Pick up, Delivery (extra cost)
Feature: RBMA SELLER
As a registered seller, I should be able to post my spare parts on RBMA platform, to sell them to other auto garages
  Quantity (in numbers/pieces), photos, description, price, seller details, seller zip code, seller contact number, seller email address
As a registered seller, I should be able to take pictures of the spare part I want to list and post it
  The app should provide the feature to take photo and upload
As a registered buyer, I should get notification on the app, to know when a buyer sends a message
  pop up notification of buyer's message
As a registered seller, I should be able to post multiple listings, to sell different spares that are with me
  user should be able to put multiple listings for different parts, that the user wants to dispose off
As a registered seller, I should have the ability to accept online payments, to complete the B2B transaction
As a registered seller, I should have the option to delete a listing that is out of stock for me
As a registered Seller, I should be able to reply to messages from the buyers, so that I can any reply to any queries from the buyers
  User should be able to reply to messages received from the buyers about a particular listing.
As a registered seller, I should get a 24 hour notice, to know that my listing will be removed.
  User shall have the ability to repost it
As a registered seller, I should get a notification, once my listing is removed by the system
  user shall have ability to repost it
As a Seller, I should have the option to repost the 30 days old postings, so that I don't have to enter the details again and again
  The photos, description, price, seller details, seller zip code, should be stored in the system, so that the seller can simple check on the stored items and repost the listing with current posting date
Feature: RBMA SYSTEM
As RBMA, the system should be able to record the posting date, to reflect the posting date on the listing
As RBMA, the system should be able to remove the listing from the display after every thirty days of posting, to ensure unavailable items are not listed anymore
As RBMA, the system should be able to store the photos, description, price, seller details, and seller zip code, to allow for reposting FIG. 1 is an illustration of an online platform 100 consistent with various embodiments of the present disclosure. By way of non-limiting example, the online platform 100 to facilitate vehicle related problems may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, and a ScanBoss device 118 over a communication network 104, such as, but not limited to, the Internet. Further, users of the online platform 100 may include relevant parties such as, but not limited to, end users, insurance companies, mechanics, towing companies, third-party data providers and administrators. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device 5100.

FIG. 2 is a schematic showing various views of a ScanBoss device, in accordance with some embodiments. FIG. 3 is a flow diagram showing operation of a RepairBoss platform and a SpareBoss platform, in accordance with some embodiments. The ScanBoss device, the RepairBoss platform and the SpareBoss platform are explained in detailed below.

1. Automobile OBD II Port: This refers to the OBD II port in cars. The SCANBOSS device can be plugged to the Car OBD port and the diagnostic report may be displayed on the RepairBoss platform which user can view (Wi-Fi, Bluetooth) from a smartphone, a tablet, a PC, etc. The device can connect to the Vehicle On-Board Diagnostic II (OBD-II) system to extract information about the repair needs, vehicle status and other critical faults that may need repair.
2. Repair Boss Application: This may be the main platform where all information is stored and shared. The user of the App will have the information of their cars registered on the App and updated as needed. Both the auto owners and garage workshops will have dashboards from where they can check their schedules, repair history, repair fees and receipts, notices and others.
3. Data Transmission: This indicates the flow of information, gathered from the Car's computer system to the RepairBoss Application.
4. Diagnostic Result: This information should be presented in text and visual presentation on the RepairBoss Application, showing a diagnostic result.
5. Auto Repair Garage Master Record and Scheduling: Each Auto Repair Technician will be required to register their garage information on the Application and interface will be developed to sync schedule.

6. Scheduling Data and Diagnostic Results: Once the Auto owner received, the diagnostic results, he/she may be able to transmit the diagnostic information to his/her auto repair technician by clicking the Auto garage name from the master record and click send the information. He/she may be able to schedule the time to bring his/her car to the garage for a repair/or schedule a pick-up/drop-off.
7. Auto Repair Garage Workshop: This may be the auto repair workshop where the auto owners would bring their car(s) for a repair. Only RepairBoss certified Auto garage would qualify to receive a customer from the RB platform. The repair estimate may also be predetermined once the auto owner has identified the problem (from the diagnosis). The Auto garage will also be able to confirm the appointment.
8. SpareBoss: This may be another Application being developed and may enable the auto garage to sell their used, OEM and aftermarket parts on the market place called SpareBoss. FIG. 4 is a block diagram of entire system of a ScanBoss device, in accordance with some embodiments. All cars and light trucks built and sold in the United States after Jan. 1, 1996 were required to be OBD II equipped. In general, this means all 1996 model year cars and light trucks are compliant, even if built in late 1995. The connector must be located within three feet of the driver and must not require any tools to be revealed. Look under the dash and behind ashtrays. Two factors will show if your vehicle is definitely OBDII equipped:
1) There will be an OBD II connector as shown 2) There will be a note on a sticker or nameplate under the hood: "OBD II compliant". The SAE J1962 specification provides for two standardized hardware interfaces, called type A and type B. Both are female, 16-pin (2×8), D-shaped connectors, and both have a groove between the two rows of pins. But type B has the groove interrupted in the middle, so you can't plug a type A male connector into a type B socket. You can, however, mate a type B male plug in a type A female socket. The type A connector (shown) is used for vehicles that use 12V supply voltage, whereas type B is used for 24V vehicles and it is required to mark the front of the D-shaped area in blue color.
2. It is critically important to protect devices attached to the OBD port from voltage spikes. ISO 7637-2 describes several types of high-voltage transients, the most dangerous of which is the Pulse 5A/B ("load dump"), a high-energy pulse with voltage as high as 60V. In this section, we present two options for over-voltage protection (OVP): PTC/TVS and transistor-based. PTC/TVS-based OVP is the simpler of the two designs, with a lower part count. In addition, this circuit may allow the load to remain powered during an overvoltage event, which may be an advantage in some situations. However, it tends to be bulkier and more expensive, especially for voltages above 60V (e.g., load dump on 24V systems) and higher operating currents. This circuit relies on the "shunt" action of the TVS ("transient voltage suppressor", similar to a Zener diode) which trips the PTC ("resettable fuse"). When the DLC_RAW voltage exceeds the breakdown voltage of the TVS(D11), its resistance drops rapidly, providing a low impedance path for the transient current. This causes the current through the PTC (F1) to increase, causing the PTC to change from low to high resistance and interrupt the current flow. It is important to correctly match the PTC and TVS. Select a PTC with a trip current that is above the maximum normal operating current, then select a TVS with a trip current rating that is sufficient to reliably trip the PTC. One inherent flaw of the PTC/TVS-based OVP is the existence of a "gray band" just above the breakdown voltage (VBR) of the TVS where the circuit does not work as intended. The voltage inside this band is insufficient for the TVS to fully enter avalanche mode; as a result, the current through the TVS is lower than is necessary to trip the PTC and can result in TVS damage from overheating. You should take care to select the TVS such that the circuit is not subjected to the voltages inside the "gray band" for longer than a few milliseconds. The purpose of the small capacitor (C22) on the input of this OVP circuit is to help suppress fast transients. Note that the reverse polarity protection diode D8 is connected after the PTC/TVS, to avoid subjecting it to the high clamping currents during the over-voltage condition.
3. In addition to VBAT, your device will require 3.3V and likely 5V (for J1850 PWM and CAN transceivers). In a typical "tandem" configuration, the 5V supply is a low-quiescent current switching regulator, and 3.3V is a low-quiescent current linear regulator. This arrangement offers the best balance of functionality, cost, footprint, and power dissipation for most applications. C25 and C26 are tank capacitors of electrolytic or ceramic type. C25 and C26 are tank capacitors of electrolytic or ceramic type. Details of the design depend on the specific requirements of your project. One practical example of the "switcher-linear regulator" configuration is the OBD power module that ships as part of the OBD Development Kit. Schematics for the OBD Power Module are available from the OBD Solutions website. The CAN bus protocol is defined by the ISO 11898-1 standard and can be summarized like this:
6. The physical layer uses differential transmission on a twisted pair wire. A non-destructive bit-wise arbitration is used to control access to the bus. The messages are small (at most eight data bytes) and are protected by a checksum. There is no explicit address in the messages, instead, each message carries a numeric value which controls its priority on the bus, and may also serve as an identification of the contents of the message. An elaborate error handling scheme that results in retransmitted messages when they are not properly received. There are effective means for isolating faults and removing faulty nodes from the bus. In short, CAN protocol is a highly fault-tolerant serial bus protocol developed in the mid-80's for message passing in vehicles. Nowadays it is used for everything from, updating gauges on the dashboard sending the accelerator position to the throttle body to control engine intake sending shift-by-wire signal reporting engine faults and many, many other mission critical functions,
7. The High Speed CAN transceiver shown in FIG. 4 is part of the "generic" OBD-II standard. We chose the MCP2562 for this reference circuit, for two reasons: it has very low standby current and is available in a small 3×3 DFN package. The low standby current means that the transceiver does not need to be switched off in low power mode. Instead, the STN2120 can put the transceiver in low power mode by applying a logic "high" to the STB' pin. In this mode, the transmitter and the high-speed part of the receiver are switched off, but the low-power receiver and the wake-up filter block are enabled to allow the device to wake-up on CAN bus activity. The only additional components are the decoupling capacitor C10, and the EMI filters R21/C11 and R22/C12. A common mistake is to add bus termination to the CAN drivers; it is unnecessary, and even harmful because it lowers the impedance of an already terminated vehicle CAN bus.

8. The Medium-Speed CAN transceiver circuit (FIG. 4) typically used to communicate with the proprietary Ford MSC vehicle bus, is identical to the High-Speed CAN transceiver circuit.

9. The Single Wire CAN Transceiver is designed to interface with the SAE J2411 (GMLAN) vehicle bus. The TH8056KDCA8's low standby current allows it to remain powered in sleep mode. MODE0 and MODE1 are used to put the transceiver in Sleep mode, as well as switch between Normal, High Speed, and High Voltage Wake-Up modes. R24 is the pull-up for the open-drain STN2120 output SW_CAN_TX. R25 is the pull-up for the ROUT pin of the transceiver. The ROUT input can be used to detect bus activity in sleep mode. R28 and R29 are the pull-ups for the open drain STN2120 outputs SW_CAN_MODE0 and SW_CAN_MODE. They should be connected to 5V_SW to avoid unnecessary current draw in sleep mode when STN2120 applies logic-LOW to these pins. The optional high-speed load circuit (controlled directly by the STN2120) can be omitted for "flight recorder" type (monitoring only) applications.

4. The ISO 9141/ISO 14230 transceiver consists of the K/L line transmitter (Q1, Q2) and a K-line receiver based on the LM339 comparator (IC7A). Note that for proper operation, the LM339 must be powered from DLC_SW (not a lower voltage power source). Also note that there are two transistors (Q2 and Q4) used to turn off the pull ups in power save mode. A common mistake is to not use a switch for DLC, and instead connect the transmitter pull-ups R27 and R28 directly to DLC or DLC_SW. Doing so can have negative consequences, ranging from excessive current draw in sleep to interference with the in vehicle network communication resulting in an engine state.

5. The SAE 1850 transceiver is made up of five blocks: V_J1850 power supply, J1850 BUS+ transmitter, J1850 BUS transmitter, PWM receiver, and VPW receiver. The V_J1850 power supply is used to power the J1850 BUS+ transmitter, which is used by both PWM and VPW protocols. PWM and VPW require different voltages, approximately 5V and 7V, respectively. STN2120 sets the voltage by controlling the LM317 adjustable regulator via the PWM/$\overline{\text{VPW}}$ signal. A logic-LOW on the PWM/$\overline{\text{VPW}}$ input causes the LM317 to output a voltage slightly higher than 7V (to account for the voltage drop in the J1850 BUS+ transmitter) while a logic-HIGH turns on Q6 which shunts R48, reducing the voltage to slightly higher than 5V: The power supply is powered from DLC_SW and is powered off in sleep.

The J1850 BUS+ transmitter consists of the bus pull-down, and a two-stage transistor switch. Schottky diodes prevent current backflow from/into the J1850_BUS+ line. The J1850 BUS transmitter can be implemented using either an NPN bipolar transistor, or an nchannel MOSFET. The NPN version is less sensitive to ESD. Both the PWM and VPW receivers are based on the LM339 comparator, and are powered from DLC_SW, which means they are powered off in sleep mode. The PWM receiver is connected to the differential J1850_BUS+/J1850_BUS− lines via 10 kΩ resistors. The VPW receiver uses a voltage divider (R50/R54) to setup the input high/low threshold.

10. The STN2120 and STN2100 are OBD to UART interpreter ICs designed to provide bi-directional, half duplex communication with the vehicle's On-Board Diagnostic system (OBD-II). They support all legislated OBD-II protocols, the STN2120 supports two additional proprietary networks: GM Single Wire CAN (GMLAN), and Ford Medium Speed CAN (MS CAN). A wealth of information can be obtained by tapping into the OBD bus, including the status of the malfunction indicator light (MIL), diagnostic trouble codes (DTCs), inspection and maintenance (I/M) information, freeze frames, VIN, hundreds of real-time parameters, and more. The STN2120 is fully compatible with the de facto industry standard ELM327 command set. Based on a 16-bit processor core, the STN2120 offers more features and better performance than any other ELM327 compatible IC.

11. Micro USB is a miniaturized version of the Universal Serial Bus (USB) interface developed for connecting compact and mobile devices such as smartphones. MP3 players GPS devices, photo printers and digital cameras. Micro USB connectors exist or have existed in three forms: micro A, micro Band micro USB 3. USB 3 micro is much like micro B, but with an additional pin group on the side for twice the wires, enabling USB 3's greater speed. Like standard USB, the micro-versions are plug-and-play and hot-swappable. The-USB peripheral bus standard was developed jointly by Compaq, IBM, DEC, Intel, Microsoft, NEC, and Northern Telecom. The technology is available without charge for all computer and device vendors.

12. The SKB501 is an advanced, highly flexible single chip solution for today's increasingly demanding ULP wireless applications for connected devices on our person, connected living environments and the IoT at large. It is designed ready for the major feature advancements of Bluetooth® 5 and energy, ANT/ANT+ and 2.4 GHz for proprietary takes advantage of Bluetooth 5's increased performance capabilities which include long range and high throughput modes. Inherent industry-grade security is essential in today's application. The nRF52840 is ready to take advantage of the considerable performance improvements for Bluetooth low energy with the arrival of the Bluetooth 5 specification. Of greatest importance is the support for longer range (up to ×4 compared to Bluetooth 4.x) and doubling of on-air data-rate, up to 2 Mbs from 1 Mbs in Bluetooth 4.x The 802.15.4 PHY and MAC layers are supported natively on the nRF52840. This allows nRF52840 to be used in a wide range of home and industrial sensor network applications as it supports two of the most popular wireless sensor standards in use today, Bluetooth low energy and 802.15.4 derivatives. This adds to the already existing radio support for Bluetooth low energy, ANT/ANT+ and 2.4 GHz for proprietary.

13. ESP32 is a series of low-cost, low-power system on a chip microcontroller with integrated Wi-Fi and dual-mode Bluetooth. The ESP32 series employs a Tensilica Mensa LX6 microprocessor in both dual-core and single-core variations and includes in-built antenna switches, RF balun, power amplifier, low-noise receive amplifier, filters, and power-management modules. ESP32 is created and developed by Espressif Systems, a Shanghai-based Chinese company, and is manufactured by TSMC using their 40 nm process. It is a successor to the ESP8266 micro-controller.

FIG. 5 is a schematic showing the position of OBD-II port in cars, in accordance with some embodiments.

The connector must be located within three feet of the driver and must not require any tools to be revealed. Look under the dash and behind ashtrays. Two factors will show if your vehicle is definitely OBDII equipped: 1) There will be an OBD II connector as shown 2) There will be a note on a sticker or nameplate under the hood: "OBD II compliant". 23. The SAE J1962 specification provides for two standardized hardware interfaces, called type A and type B. Both are female, 16-pin (2×8), D-shaped connectors, and both have a groove between the two rows of pins. But type B has the groove interrupted in the middle, so you can't plug a type A male connector into a type B socket. You can, however, mate a type B male plug in a type A female socket. The type A connector (shown) is used for vehicles that use 12V supply voltage, whereas type B is used for 24V vehicles and it is required to mark the front of the D-shaped area in blue color.

FIG. 7 is a block diagram showing the flow of data from server to mobile communication, and to a hardware system, in accordance with some embodiments. The flow of data from server to mobile communication, and to hardware system of the vehicle 28 is the OBD2 port 29, the OBD2 data interpreter 30, data processing 31, communication BLE/WIFI 32, Android/IOS Smartphones 33, is the cloud-internet 34.

When the OBD2 connector is inserted in the OBD2 port of the vehicle the first thing that the hardware do is the broadcasting and advertising to establish and to authenticate the mobile communication. After when the connection is established the mobile app sends commands that are PIDS for the parameters of on board diagnostics of the vehicle the hardware processor receives those commands and processes them and sends them to the OBD interpreter and which in turn send to the vehicle MCU.

FIG. 8 is a schematic of a method of a RepairBoss platform to facilitate an appointment with an auto garage owner, in accordance with some embodiments. Further, the method may include an auto owner selecting part of a car where an issue may be noticed. Further, based on symptoms of the issue such as temperature fluctuations, water pump failure, coolant leak, water pump whining sound, etc. the auto owner may search for auto workshop based on the location of the auto owner. Further, the method may include a step of listing of services such as oil change water, pump, brakes, shaft, and springs of a selected auto garage. Further, the method may include a step of selecting water pump from the list of services. Further, a fare estimate may be available to the auto owner based on location, region, and review of the auto garage. Further, the method may include a step of user creating an appointment with an auto garage via (RepairBoss) RB schedule service. Further, the method may include a step of receiving schedule information to the auto garage owner with the preliminary information. FIG. 9 is a schematic of a RepairBoss platform providing various functions, in accordance with some embodiments.

FIG. 10 is a schematic of a RepairBoss platform providing various functions, in accordance with some embodiments. Further, the RepairBoss platform may include a RepairBoss server facilitating an end user to perform various functions such as sending pictures of collision, information about crash, license plates, etc. Further, RepairBoss server may be linked to mechanics, insurance companies, towing companies, third-party API's such as Ministry of Transportation for vehicle info, NHTSA, etc.

FIG. 11 is a schematic of a flowchart of a method for a RepairBoss platform to facilitate in connecting a user with an auto garage, in accordance with some embodiments. Further, the method may include a step of sign up through free, premium, or VIP membership via HTTPs. Further, the method may include a step of authenticating the information in information database. Further, the method may include a step of finding valuation of an object which needs to be repaired. Further, the method may include a step of finding an auto garage nearby to the location of the user. Further, the method may include a user renting a car service and informing the pick-up time to the auto garage. Further, the method may include a step of paying the money to get the required customer service.

FIG. 12 is a schematic showing VIP services of a RepairBoss platform, in accordance with some embodiments. Further, the VIP service may include an annual fee. Further, the VIP service may include provided benefits such as coupons, discounts, gifts, and rent-car privilege.

FIG. 13 is a schematic of a method for a RepairBoss platform showing a partner insurance company updating profile, in accordance with some embodiments. Further, the method may include a step of signing up on a website by the partner insurance company. Further, the method may include a step of making the payment. Further, the method may include a step of getting an email confirmation that the profile may have updated.

FIG. 14 is a schematic of a method for a RepairBoss platform to determine valuation of a car, in accordance with some embodiments. Further, the method may include a step of uploading the collision pictures via the RepairBoss platform. Further, the method may include a step of determining the valuation of the car by a partner insurance company.

FIG. 15 is a schematic of a method for a RepairBoss platform to rent-car service, in accordance with some embodiments. Further, the method may include a step of a customer signing into a website/mobile application and finding a driver. Further, the method may include a step of negotiating the price and signing the contract to get a personal driver. Further, the customer may rent a car service.

FIG. 16 is a block diagram showing OBD-II protocol interpreter, in accordance with some embodiments.

The protocols the device support:
Support for all legislated OBD-II protocols:
ISO 15765-4 (CAN)
ISO 14230-4 (Keyword Protocol 2000)
ISO 9141-2 (Asian, European, Chrysler vehicles)
SAE J1850 VPW (GM vehicles)
SAE J1850 PWM (Ford vehicles)
Support for non-legislated OBD protocols:
ISO 15765
ISO 11898 (raw CAN)
GMLAN Single Wire CAN2
(GMW3089)
Ford Medium Speed CAN2
(MS CAN)
Support for the heavy-duty SAE J1939 OBD protocol
The automobile Categories:
Short-haul trucks
Long-haul trucks
Heavy duty trucks
cars
SUV Targets:
Auto Owners
Auto Garages
Used Car Dealers
Auto Auction company
Pre-auto purchase decisions: It can tell if a used car has a problem before a purchase decision is made.
Market: Global
The ScanBoss device may comprise including:
Voltage Sensor module
Protection module
5.0 Volts supply module
3.3 Volts supply module
CAN_transceiver module
ISO_9141_14230 module
SAE_J1850_Transceiver module
SKB01_NRF module
STN2120 module
ESP32 module
The ScanBoss device may comprise a protection module.
Protection:
This module includes fuse, TVS diode and schottky diode for incoming battery voltage protection.
It is critically important to protect devices attached to the OBD port from voltage spikes. ISO 7637-2 describes several types of high-voltage transients, the most dangerous of which is the Pulse 5A/B ("load dump").

The ScanBoss device may have a voltage sensor.
Voltage Sense:
This module includes battery voltage sensing circuit and 3 status led indication circuits. This module steps down the car battery voltage and feed to STN2120 to calculate battery levels.

The ScanBoss device may comprise a 5 volts supply module and 3.3 volts supply module.
5.0 Volts supply & 3.3 Volts supply:
In addition to VBAT, your device will require 3.3V and likely 5V (for J1850 PWM and CAN transceivers). In a typical "tandem" configuration, the 5V supply is a low-quiescent current switching regulator, and 3.3V is a low-quiescent current linear regulator. This arrangement offers the best balance of functionality, cost, footprint, and power dissipation for most applications. C25 and C26 are tank capacitors of electrolytic or ceramic type.

The ScanBoss device may comprise a STN2120 module.
STN2120:
This module includes OBD2 connector and stn2120 which is a 44-pin OBD to UART interpreter IC that provides bi-directional, half-duplex communication with all vehicle OBD-II legislated protocols, plus support for SW-CAN (GM) & MS-CAN (Ford). This includes basic stn2120 configuration and start-up circuits.

The ScanBoss device may comprise a CAN transceiver module.
CAN_transceiver:
The MCP2551 is an older generation CAN transceiver which is sometimes used in new designs for cost reasons. Due to its high sleep current (up to 465 μA) it should be switched off in sleep. For this reason, the MCP2551 is powered from 5V_SW. The R17 and R18 pull-ups to 3.3V on TIN and ROUT are necessary to keep the signal lines from floating in sleep mode. The 1 k pull-up to 5V_SW on the TIN pin (R16) is required for normal operation. It is switched off in sleep mode to reduce the current consumption. R21 is used for slope control; the value of 4.7 kΩ was selected to reduce EMI without compromising the reliability of communication.

The ScanBoss device may comprise a CAN transceiver module.
The Single Wire CAN Transceiver is designed to interface with the SAE J2411 (GMLAN) vehicle bus. The TH8056KDCA8's low standby current allows it to remain powered in sleep mode. MODE0 and MODE1 are used to put the transceiver in Sleep mode, as well as switch between Normal, High Speed, and High Voltage Wake-Up modes.

The ScanBoss device may comprise an ISO 9141 14230 module.
ISO_9141_14230:
The ISO 9141/ISO 14230 transceiver consists of the K/L line transmitter (Q1, Q2) and a K-line receiver based on the LM339 comparator (IC7A).
Note that for proper operation, the LM339 must be powered from DLC_SW (not a lower voltage power source).

The ScanBoss device may comprise an SAE J1850 transceiver module.
SAE_J1850_Transceiver:
The SAE 1850 transceiver is made up of five blocks: V_J1850 power supply, J1850 BUS+ transmitter, J1850 BUS− transmitter, PWM receiver, and VPW receiver. The V_J1850 power supply is used to power the J1850 BUS+ transmitter, which is used by both PWM and VPW protocols. PWM and VPW require different voltages, approximately 5V and 7V, respectively. STN21XX sets the voltage by controlling the LM317 adjustable regulator via the PWM/‾ ‾ ‾ ‾ VPW signal. A logic-LOW on the PWM/‾ ‾ ‾ ‾ VPW input causes the LM317 to output a voltage slightly higher than 7V (to account for the voltage drop in the J1850 BUS+ transmitter) while a logic-HIGH turns on Q6 which shunts R48, reducing the voltage to slightly higher than 5V. The power supply is powered from DLC_SW and is powered off in sleep. The J1850 BUS+ transmitter consists of the bus pull-down, and a two-stage transistor switch. Schottky diodes prevent current backflow from/into the J1850_BUS+ line. The J1850 BUS− transmitter can be implemented using either an NPN bipolar transistor, or an nchannel MOSFET. The NPN version is less sensitive to ESD.

SKB01_NRF:
The SKB501 is an advanced, highly flexible single chip solution for today's increasingly demanding ULP wireless applications for connected devices on our person, connected living environments and the IoT at large. It is designed ready for the major feature advancements of Bluetooth® 5 and takes advantage of Bluetooth 5's increased performance capabilities which include long range and high throughput modes. Inherent industry-grade security is essential in today's application.

The nRF52840 is ready to take advantage of the considerable performance improvements for Bluetooth low energy with the arrival of the Bluetooth 5 specification. Of greatest importance is the support for longer range (up to ×4 compared to Bluetooth 4.x) and doubling of on-air data-rate, up to 2 Mbs from 1 Mbs in Bluetooth 4.x.

The 802.15.4 PHY and MAC layers are supported natively on the nRF52840. This allows nRF52840 to be used in a wide range of home and industrial sensor network applications as it supports two of the most popular wireless sensor standards in use today, Bluetooth low energy and 802.15.4 derivatives. This adds to the already existing radio support for Bluetooth low energy, ANT/ANT+ and 2.4 GHz for proprietary.

ESP32:
ESP32 is a series of low-cost, low-power system on a chip microcontroller with integrated Wi-Fi and dual-mode Bluetooth. The ESP32 series employs a Tensilica Xtensa LX6 microprocessor in both dual-core and single-core variations and includes in-built antenna switches, RF balun, power amplifier, low-noise receive amplifier, filters, and power-management modules. ESP32 is created and developed by Espressif Systems, a Shanghai-based Chinese company, and is manufactured by TSMC using their 40 nm process. [2] It is a successor to the ESP8266 microcontroller.

| Service (hex) | Description |
| --- | --- |
| 01 | Show current data |
| 02 | Show freeze frame data |
| 03 | Show stored Diagnostic Trouble Codes |
| 04 | Clear Diagnostic Trouble Codes and stored values |

-continued

| Service (hex) | Description |
| --- | --- |
| 05 | Test results, oxygen sensor monitoring (non CAN only) |
| 06 | Test results, other component/system monitoring (Test results, oxygen sensor monitoring for CAN only) |
| 07 | Show pending Diagnostic Trouble Codes (detected during current or last driving cycle) |
| 08 | Control operation of on-board component/system |
| 09 | Request vehicle information |
| 0A | Permanent Diagnostic Trouble Codes (DTCs) (Cleared DTCs) |

Service 01

| Features | Min value | Max value | Units | Formula[a] |
| --- | --- | --- | --- | --- |
| PIDs supported [01-20] | | | | Bit encoded [A7 . . . D0] == [PID $01 . . . PID $20] See below |
| Monitor status since DTCs cleared. (Includes malfunction indicator lamp (MIL) status and number of DTCs.) | | | | Bit encoded. See below. |
| Freeze DTC | | | | |
| Fuel System status | | | | Bit encoded. See below. |
| Calculated engine load | 0 | 100 | % | |
| Engine coolant temperature | −40 | 215 | ° C. | |
| Short term fuel trim- Bank 1 | −100 (Reduce Fuel: Too Rich) | 99.2 (Add Fuel: Too Lean) | % | |
| Long term fuel trim- Bank 1 | | | | |
| Short term fuel trim- Bank 2 | | | | |
| Long term fuel trim- Bank 2 | | | | |
| Fuel pressure (gauge pressure) | 0 | 765 | kPA | |
| Intake manifold absolute pressure | 0 | 255 | kPA | |
| Engine RPM | 0 | 16,383.75 | Rpm | |
| Vehicle speed | 0 | 255 | Km/h | |
| Timing advance | −64 | 63.5 | ° before TDC | |
| Intake air temperature | −40 | 215 | ° C. | |
| MAF air flow rate | 0 | 655.35 | Grams/sec | |
| Throttle position | 0 | 100 | % | |
| Commanded secondary air status | | | | Bit encoded. See below. |
| Oxygen sensors present (in 2 banks) | | | | [A0 . . . A3] == Bank 1, Sensors 1-4. [A4 . . . A7] == Bank 2 . . . |
| Oxygen sensor 1 A: voltage B: short term fuel trim | | | | |
| Oxygen sensor 2 A: voltage B: short term fuel trim | | | | |
| Oxygen sensor 3 A: voltage B: short term fuel trim | 0 −100 | 1.275 99.2 | Volts % | (if B==$FF, sensor is not used in trim calculation) |
| Oxygen sensor 4 A: voltage B: short term fuel trim | | | | |
| Oxygen sensor 5 A: voltage B: short term fuel trim | | | | |
| Oxygen sensor 6 A: voltage B: short term fuel trim | | | | |
| Oxygen sensor 7 A: voltage B: short term fuel trim | | | | |
| Oxygen sensor 8 A: voltage B: short term fuel trim | | | | |

-continued

| Features | Min value | Max value | Units | Formula[a] |
|---|---|---|---|---|
| OBD standards this vehicle conforms to | | | | Bit encoded. See below. |
| Oxygen sensors present (in 4 banks) | | | | Similar to PID 13, but [A0 ... A7] == (B1S1, B1S2, B2S1, B2S2, B3S1, B3S2, B4S1, B4S2] |
| Auxiliary input status | | | | A0 == Power Take Off (PTO) status (1 == active) [A1 ... A7] not used |
| Run time since engine start | 0 | 65,535 | Seconds | |
| PIDs supported [21-40] | | | | Bit encoded [A7.D0] == [PID $21 ... PID $40] See below |
| Distance traveled with malfunction indicator lamp (MIL) on | 0 | 65,535 | Km | |
| Fuel Rail Pressure (relative to manifold vacuum) | 0 | 5177.265 | kPA | |
| Fuel Rail Gauge Pressure (diesel, or gasoline direct injection) | 0 | 655,350 | kPA | |
| Oxygen Sensor 1 | | | | |
| AB: Fuel-Air Equivalence Ratio | 0 | <2 | Ratio | |
| CD: Voltage | 0 | <8 | V | |
| Oxygen Sensor 2 | | | | |
| AB: Fuel-Air Equivalence Ratio | | | | |
| CD: Voltage | | | | |
| Oxygen Sensor 3 | | | | |
| AB: Fuel-Air Equivalence Ratio | | | | |
| CD: Voltage | | | | |
| Oxygen Sensor 4 | | | | |
| AB: Fuel-Air Equivalence Ratio | | | | |
| CD: Voltage | | | | |
| Oxygen Sensor 5 | | | | |
| AB: Fuel-Air Equivalence Ratio | | | | |
| CD: Voltage | | | | |
| Oxygen Sensor 6 | | | | |
| AB: Fuel-Air Equivalence Ratio | | | | |
| CD: Voltage | | | | |
| Oxygen Sensor 7 | | | | |
| AB: Fuel-Air Equivalence Ratio | | | | |
| CD: Voltage | | | | |
| Oxygen Sensor 8 | | | | |
| AB: Fuel-Air Equivalence Ratio | | | | |
| CD: Voltage | | | | |
| Commanded EGR | 0 | 100 | % | |
| EGR Error | −100 | 99.2 | % | |
| Commanded evaporative purge | 0 | 100 | % | |
| Fuel Tank Level Input | 0 | 100 | % | |
| Warm-ups since codes cleared | 0 | 255 | Count | |
| Distance traveled since codes cleared | 0 | 65,535 | Km | |
| Evap. System Vapor Pressure | −8,192 | 8191.75 | Pa | (AB is two's complement signed)(3) |
| Absolute Barometric Pressure | 0 | 255 | kPa | |
| Oxygen Sensor 1 | | | | |
| AB: Fuel-Air Equivalence Ratio | | | | |
| CD: Current | | | | |
| Oxygen Sensor 2 | | | | |
| AB: Fuel-Air Equivalence Ratio | 0 | <2 | Ratio | |
| CD: Current | −128 | <128 | mA | |
| Oxygen Sensor 3 | | | | |
| AB: Fuel-Air Equivalence | | | | |

-continued

| Features | Min value | Max value | Units | Formula[a] |
|---|---|---|---|---|
| Ratio | | | | |
| CD: Current | | | | |
| Oxygen Sensor 4 | | | | |
| AB: Fuel-Air Equivalence Ratio | | | | |
| CD: Current | | | | |
| Oxygen Sensor 5 | | | | |
| AB: Fuel-Air Equivalence Ratio | | | | |
| CD: Current | | | | |
| Oxygen Sensor 6 | | | | |
| AB: Fuel-Air Equivalence Ratio | | | | |
| CD: Current | | | | |
| Oxygen Sensor 7 | | | | |
| AB: Fuel-Air Equivalence Ratio | | | | |
| CD: Current | | | | |
| Oxygen Sensor 8 | | | | |
| AB: Fuel-Air Equivalence Ratio | | | | |
| CD: Current | | | | |
| Catalyst Temperature: Bank 1, Sensor 1 | | | | |
| Catalyst Temperature: Bank 2, Sensor 1 | −40 | 6,513.5 | ° C. | |
| Catalyst Temperature: Bank 1, Sensor 2 | | | | |
| Catalyst Temperature: Bank 2, Sensor 2 | | | | |
| PIDs supported [41-60] | | | | Bit encoded [A7 . . . D0] == [PID $41 . . . PID $60] See below |
| Monitor status this drive cycle | | | | Bit encoded. See below. |
| Control module voltage | 0 | 65.535 | V | |
| Absolute load value | 0 | 25,700 | % | |
| Fuel-Air commanded equivalence ratio | 0 | <2 | Ratio | |
| Relative throttle position | 0 | 100 | % | |
| Ambient air temperature | −40 | 215 | ° C. | |
| Absolute throttle position B | | | | |
| Absolute throttle position C | | | | |
| Accelerator pedal position D | 0 | 100 | % | |
| Accelerator pedal position E | | | | |
| Accelerator pedal position F | | | | |
| Commanded throttle actuator | | | | |
| Time run with MIL on | 0 | 65,535 | minutes | |
| Time since trouble codes cleared | | | | |
| Maximum value for Fuel-Air equivalence ratio, oxygen sensor voltage, oxygen sensor current, and intake manifold absolute pressure | 0, 0, 0, 0 | 255, 255, 255, 2550 | Ratio, V, mA, kPA | A, B, C, D*10 |
| Maximum value for air flow rate from mass air flow sensor | 0 | 2550 | g/s | A*10, B, C, and D are reserved for future use |
| Fuel Type | | | | From fuel type table see below |
| Ethanol fuel % | 0 | 100 | % | |
| Absolute Evap system Vapor Pressure | 0 | 327.675 | kPA | |
| Evap system vapor pressure | 32,767 | 32,768 | Pa | ((A*256) + B) − 32767 |
| Short term secondary oxygen sensor trim, A: bank 1, B: bank 3 | | | | |
| Long term secondary oxygen sensor trim, A: bank 1, B: bank 3 | −100 | 99.2 | % | |

-continued

| Features | Min value | Max value | Units | Formula[a] |
|---|---|---|---|---|
| Short term secondary oxygen sensor trim, A: bank 2, B: bank 4 | | | | |
| Long term secondary oxygen sensor trim, A: bank 2, B: bank 4 | | | | |
| Fuel rail absolute pressure | 0 | 655,350 | kPA | |
| Relative accelerator pedal position | 0 | 100 | % | |
| Hybrid battery pack remaining life | 0 | 100 | % | |
| Engine oil temperature | −40 | 210 | ° C. | |
| Fuel injection timing | −210.00 | 301.992 | ° | |
| Engine fuel rate | 0 | 3212.75 | L/h | |
| Emission requirements to which vehicle is designed | | | | Bit encoded |
| PIDs supported [61-80] | | | | Bit encoded [A7 ... D0] == [PID $61 ... PID $80] See below |
| Driver's demand engine-percent torque | −125 | 130 | % | A-125 |
| Actual engine-percent torque | −125 | 130 | % | A-125 |
| Engine reference torque | 0 | 65,535 | Nm | |
| Engine percent torque data | −125 | 130 | % | A-125 Idle<br>B-125 Engine point 1<br>C-125 Engine point 2<br>D-125 Engine point 3<br>E-125 Engine point 4 |
| Auxiliary input/output supported | | | | Bit encoded |
| Mass air flow sensor | | | | |
| Engine coolant temperature | | | | |
| Intake air temperature sensor | | | - | |
| Commanded EGR and EGR Error | | | | |
| Commanded Diesel intake air flow control and relative intake air flow position | | | | |
| Exhaust gas recirculation temperature | | | | |
| Commanded throttle actuator control and relative throttle position | | | | |
| Fuel pressure control system | | | | |
| Injection pressure control system | | | | |
| Turbocharger compressor inlet pressure | | | | |
| Boost pressure control | | | | |
| Variable Geometry turbo (VGT) control | | | | |
| Wastegate control | | | | |
| Exhaust pressure | | | | |
| Turbocharger RPM | | | | |
| Turbocharger temperature | | | | |
| Turbocharger temperature | | | | |
| Charge air cooler temperature (CACT) | | | | |
| Exhaust Gas temperature (EGT) Bank 1 | | | | Special PID. See below |
| Exhaust Gas temperature (EGT) Bank 2 | | | | Special PID. See below |
| Diesel particulate filter (DPF) | | | | |
| Diesel particulate filter (DPF) | | | | |
| Diesel particulate filter | | | | |

-continued

| Features | Min value | Max value | Units | Formula[a] |
|---|---|---|---|---|
| (DPF) temperature | | | | |
| NOx NTE (Not-To-Exceed) control area status | | | | |
| PM NTE (Not-To-Exceed) control area status | | | | |
| Engine run time | | | | |
| PIDs supported [81-A0] | | | | Bit encoded [A7 . . . D0] == [PID $81 . . . PID $A0] See below |
| Engine run time for Auxiliary Emissions Control Device (AECD) | | | | |
| Engine run time for Auxiliary Emissions Control Device (AECD) | | | | |
| NOx sensor Manifold surface temperature | | | | |
| NOx reagent system | | | | |
| Particulate matter (PM) sensor | | | | |
| Intake manifold absolute pressure | | | | |
| SCR Induce System | | | | |
| Run Time for AECD #11-#15 | | | | |
| Run Time for AECD #16-#20 | | | | |
| Diesel Aftertreatment O2 Sensor (Wide Range) | | | | |
| Throttle Position G | 0 | 100 | % | |
| Engine Friction-Percent Torque | −125 | 130 | % | |
| PM Sensor Bank 1 & 2 | | | | |
| WWH-OBD Vehicle OBD System Information | | | Hours | |
| WWH-OBD Vehicle OBD System Information | | | Hours | |
| Fuel System Control | | | | |
| WWH-OBD Vehicle OBD Counters support | | | | |
| NOx Warning And Inducement System | | | | |
| Exhaust Gas Temperature Sensor | | | | |
| Exhaust Gas Temperature Sensor | | | | |
| Hybrid/EV Vehicle System Data, Battery, Voltage | | | | |
| Diesel Exhaust Fluid Sensor Data O2 Sensor Data | | | | |
| Engine Fuel Rate | | | g/s | |
| Engine Exhaust Flow Rate | | | Kg/h | |
| Fuel System Percentage Use | | | | |
| PIDs supported [A1-C0] | | | | Bit encoded [A7 . . . D0] == [PID $A1 . . . PID $C0] See below |
| NOx Sensor Corrected Data | | | ppm | |
| Cylinder Fuel Rate | | | mg/stroke | |
| Evap System Vapor Pressure | | | Pa | |
| Transmission Actual Gear | | | | |
| Diesel Exhaust Fluid Dosing Odometer | | | hm | |
| PIDs supported (C1-E0] | | | | Bit encoded [A7 . . . D0] == [PID $C1 . . . PID $E0] See below |
| ? | ? | ? | ? | Returns numerous data, including Drive Condition ID and Engine Speed* |
| ? | ? | ? | ? | B5 is Engine Idle Request B6 is Engine Stop Request* |

| Features | Min value | Max value | Units | Formula[a] |
|---|---|---|---|---|
| DTC that caused freeze frame to be stored. in service 3 | | | | BCD encoded. Decoded as |

Service 03

| Features | Min value | Max value | Units | Formula[a] |
|---|---|---|---|---|
| Request trouble codes | | | | 3 codes per message frame. See below |

Service 04

| Features | Min value | Max value | Units | Formula[a] |
|---|---|---|---|---|
| Clear trouble codes/ Malfunction indicator lamp (MIL)/Check engine light | | | | Clears all stored trouble codes and turns the MIL off. |

Service 05

| Features OBD Monitor IDs supported ($01-$20) | Min value | Max value | Units | Formula[a] |
|---|---|---|---|---|
| O2 Sensor Monitor Bank 1 Sensor 1 | 0.00 | 1.275 | volts | 0.005 Rich to lean sensor threshold voltage |
| O2 Sensor Monitor Bank 1 Sensor 2 | 0.00 | 1.275 | volts | 0.005 Rich to lean sensor threshold voltage |
| O2 Sensor Monitor Bank 1 Sensor 3 | 0.00 | 1.275 | volts | 0.005 Rich to lean sensor threshold voltage |
| O2 Sensor Monitor Bank 1 Sensor 4 | 0.00 | 1.275 | volts | 0.005 Rich to lean sensor threshold voltage |
| O2 Sensor Monitor Bank 2 Sensor 1 | 0.00 | 1.275 | volts | 0.005 Rich to lean sensor threshold voltage |
| O2 Sensor Monitor Bank 2 Sensor 2 | 0.00 | 1.275 | volts | 0.005 Rich to lean sensor threshold voltage |
| O2 Sensor Monitor Bank 2 Sensor 3 | 0.00 | 1.275 | volts | 0.005 Rich to lean sensor threshold voltage |
| O2 Sensor Monitor Bank 2 Sensor 4 | 0.00 | 1.275 | volts | 0.005 Rich to lean sensor threshold voltage |
| O2 Sensor Monitor Bank 3 Sensor 1 | 0.00 | 1.275 | volts | 0.005 Rich to lean sensor threshold voltage |
| O2 Sensor Monitor Bank 3 Sensor 2 | 0.00 | 1.275 | volts | 0.005 Rich to lean sensor threshold voltage |
| O2 Sensor Monitor Bank 3 Sensor 3 | 0.00 | 1.275 | volts | 0.005 Rich to lean sensor threshold voltage |
| O2 Sensor Monitor Bank 3 Sensor 4 | 0.00 | 1.275 | volts | 0.005 Rich to lean sensor threshold voltage |
| O2 Sensor Monitor Bank 4 Sensor 1 | 0.00 | 1.275 | volts | 0.005 Rich to lean sensor threshold voltage |
| O2 Sensor Monitor Bank 4 Sensor 2 | 0.00 | 1.275 | volts | 0.005 Rich to lean sensor threshold voltage |
| O2 Sensor Monitor Bank 4 Sensor 3 | 0.00 | 1.275 | volts | 0.005 Rich to lean sensor threshold voltage |
| O2 Sensor Monitor Bank 4 Sensor 4 | 0.00 | 1.275 | volts | 0.005 Rich to lean sensor threshold voltage |
| O2 Sensor Monitor Bank 1 Sensor 1 | 0.00 | 1.275 | volts | 0.005 Lean to Rich sensor threshold voltage |
| O2 Sensor Monitor Bank 1 Sensor 2 | 0.00 | 1.275 | volts | 0.005 Lean to Rich sensor threshold voltage |
| O2 Sensor Monitor Bank 1 Sensor 3 | 0.00 | 1.275 | volts | 0.005 Lean to Rich sensor threshold voltage |
| O2 Sensor Monitor Bank 1 Sensor 4 | 0.00 | 1.275 | volts | 0.005 Lean to Rich sensor threshold voltage |
| O2 Sensor Monitor Bank 2 Sensor 1 | 0.00 | 1.275 | volts | 0.005 Lean to Rich sensor threshold voltage |
| O2 Sensor Monitor Bank 2 Sensor 2 | 0.00 | 1.275 | volts | 0.005 Lean to Rich sensor threshold voltage |
| O2 Sensor Monitor Bank 2 Sensor 3 | 0.00 | 1.275 | volts | 0.005 Lean to Rich sensor threshold voltage |
| O2 Sensor Monitor Bank 2 Sensor 4 | 0.00 | 1.275 | volts | 0.005 Lean to Rich sensor threshold voltage |
| O2 Sensor Monitor Bank 3 Sensor 1 | 0.00 | 1.275 | volts | 0.005 Lean to Rich sensor threshold voltage |
| O2 Sensor Monitor Bank 3 Sensor 2 | 0.00 | 1.275 | volts | 0.005 Lean to Rich sensor threshold voltage |
| O2 Sensor Monitor Bank 3 Sensor 3 | 0.00 | 1.275 | volts | 0.005 Lean to Rich sensor threshold voltage |
| O2 Sensor Monitor Bank 3 Sensor 4 | 0.00 | 1.275 | volts | 0.005 Lean to Rich sensor threshold voltage |
| O2 Sensor Monitor Bank 4 Sensor 1 | 0.00 | 1.275 | volts | 0.005 Lean to Rich sensor threshold voltage |
| O2 Sensor Monitor Bank 4 Sensor 2 | 0.00 | 1.275 | volts | 0.005 Lean to Rich sensor threshold voltage |
| O2 Sensor Monitor Bank 4 Sensor 3 | 0.00 | 1.275 | volts | 0.005 Lean to Rich sensor threshold voltage |
| O2 Sensor Monitor Bank 4 Sensor 4 | 0.00 | 1.275 | volts | 0.005 Lean to Rich sensor threshold voltage |

Service 09

| Features | Min value | Max value | Units | Formula[a] |
|---|---|---|---|---|
| Service 9 supported PIDs 01 to 20) | | | | Bit encoded. [A7 ... D0] = [PID $01 ... PID $20) See below |
| VIN Message Count in PID 02. Only for ISO 9141-2, ISO 14230-4 and SAE J1850. | | | | Usually the value will be 5. |
| Vehicle Identification Number (VIN) | | | | 17-char VIN, ASCIIencoded and left-padded with null chars (0x00) if needed to. |
| Calibration ID message count for PID 04. Only for ISO 9141-2, ISO 14230-4 and SAE J1850. | | | | It will be a multiple of 4 (4 messages are needed for each ID). |
| Calibration ID | | | | Up to 16 ASCII chars. Data bytes not used will be reported as null bytes (0x00). Several CALID can be outputed (16 bytes each) |
| Calibration verification numbers (CVN) message count for PID 06. Only for ISO 9141-2, ISO 14230-4 and SAE J1850. | | | | |
| Calibration Verification Numbers (CVN) | | | | Raw data left-padded with null characters |
| Several CVN can be output (4 bytes each) the number of CVN and CALID must match | | | | (0x00). Usually displayed as hex string. |
| In-use performance tracking message count for PID 08 and 0B. Only for ISO 9141-2, ISO 14230-4 and SAE J1850. | 8 | 10 | | 8 if sixteen (16) values are required to be reported, 9 if eighteen (18) values are required to be reported, and 10 if twenty (20) values are required to be reported (one message reports two values, each one consisting in two bytes). |
| In-use performance tracking for spark ignition vehicles ECU name message count for PID 0A | | | | 4 or 5 messages, each one containing 4 bytes (two values). See below |
| ECU name | | | | ASCII-coded. Rightpadded with null chars (0x00). |
| In-use performance tracking for compression ignition vehicles | | | | 5 messages, each one containing 4 bytes (two values). See below |

Service 01 PID 01

| Features |
|---|
| Off or On, indicates if the CEL/MIL is on (or should be on) |
| Number of confirmed emissions-related DTCs available for display. |
| Reserved (should be 0) |
| 0 = Spark ignition monitors supported (e.g. Otto or Wankel engines) |
| 1 = Compression ignition monitors supported (e.g. Diesel engines) |

Here are the common bit B definitions, they are test based.

| | Test available | Test incomplete |
|---|---|---|
| Components | B2 | B6 |
| Fuel System | B1 | B5 |
| Misfire | B0 | B4 |
| EGR System | C7 | D7 |
| Oxygen Sensor Heater | C6 | D6 |
| Oxygen Sensor | C5 | D5 |
| A/C Refrigerant | C4 | D4 |
| Secondary Air System | C3 | D3 |
| Evaporative System | C2 | D2 |
| Heated Catalyst | C1 | D1 |
| Catalyst | C0 | D0 |

And the bytes C and D for compression ignition monitors (Diesel engines):

| | Test available | Test incomplete |
|---|---|---|
| EGR and/or VVT System | C7 | D7 |
| PM filter monitoring | C6 | D6 |
| Exhaust Gas Sensor | C5 | D5 |
| Reserved | C4 | D4 |
| Boost Pressure | C3 | D3 |
| Reserved | C2 | D2 |

-continued

|  | Test available | Test incomplete |
|---|---|---|
| NOx/SCR Monitor | C1 | D1 |
| NMHC Catalyst[a] | C0 | D0 |

1. [a] NMHC may stand for Non-Methane Hydrocarbons, but J1979 does not enlighten us. The translation would be the ammonia sensor in the SCR catalyst.

Service 01 PID 41

|  | Test available | Test incomplete |
|---|---|---|
| Components | B2 | B6 |
| Fuel System | B1 | B5 |
| Misfire | B0 | B4 |

The bytes C and D for spark ignition monitors (e.g. Otto or Wankel engines):

|  | Test available | Test incomplete |
|---|---|---|
| EGR System | C7 | D7 |
| Oxygen Sensor Heater | C6 | D6 |
| Oxygen Sensor | C5 | D5 |
| A/C Refrigerant | C4 | D4 |
| Secondary Air System | C3 | D3 |
| Evaporative System | C2 | D2 |
| Heated Catalyst | C1 | D1 |
| Catalyst | C0 | D0 |

And the bytes C and D for compression ignition monitors (Diesel engines):

|  | Test available | Test incomplete |
|---|---|---|
| EGR and/or VVT System | C7 | D7 |
| PM filter monitoring | C6 | D6 |
| Exhaust Gas Sensor | C5 | D5 |
| Reserved | C4 | D4 |
| Boost Pressure | C3 | D3 |
| Reserved | C2 | D2 |
| NOx/SCR Monitor | C1 | D1 |
| NMHC Catalyst[a] | C0 | D0 |

1. [a] NMHC may stand for Non-Methane Hydrocarbons, but J1979 does not enlighten us. The translation would be the ammonia sensor in the SCR catalyst.

Service 01 PID 78

A request for this PID will return 9 bytes of data. The first byte is a bit encoded field indicating which EGT sensors 5 are supported:

| Byte | Description |
|---|---|
| A | Supported EGT sensors |
| B-C | Temperature read by EGT11 |
| D-E | Temperature read by EGT12 |
| F-G | Temperature read by EGT13 |
| H-I | Temperature read by EGT14 |

The first byte is bit-encoded as follows:

| Bit | Description |
|---|---|
| A7-A4 | Reserved |
| A3 | EGT bank 1, sensor 4 supported? |
| A2 | EGT bank 1, sensor 3 supported? |
| A1 | EGT bank 1, sensor 2 supported? |
| A0 | EGT bank 1, sensor 1 supported? |

Service 03 (no PID required)

| A7-A6 | First DTC character |
|---|---|
| 00 | P—Powertrain |
| 01 | C—Chassis |
| 10 | B—Body |
| 11 | U—Network |

The two following digits are encoded as 2 bits. The second character in the DTC is a number defined by the following table:

| A5-A4 | Second DTC character |
|---|---|
| 00 | 0 |
| 01 | 1 |
| 10 | 2 |
| 11 | 3 |

The third character in the DTC is a number defined by

| A3-A0 | Third DTC character |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | A |
| 1011 | B |
| 1100 | C |
| 1101 | D |
| 1110 | E |
| 1111 | F |

Service 09 PID 08

| Mnemonic | Description |
|---|---|
| OBDCOND | OBD Monitoring Conditions Encountered Counts |
| IGNCNTR | Ignition Counter |
| CATCOMP1 | Catalyst Monitor Completion Counts Bank 1 |
| CATCOND1 | Catalyst Monitor Conditions Encountered Counts Bank 1 |
| CATCOMP2 | Catalyst Monitor Completion Counts Bank 2 |
| CATCOND2 | Catalyst Monitor Conditions Encountered Counts Bank 2 |
| O2SCOMP1 | O2 Sensor Monitor Completion Counts Bank1 |
| O2SCOND1 | O2 Sensor Monitor Conditions Encountered Counts Bank 1 |
| O2SCOMP2 | O2 Sensor Monitor Completion Counts Bank2 |
| O2SCOND2 | O2 Sensor Monitor Conditions Encountered Counts Bank 2 |
| EGRCOMP | EGR Monitor Completion Condition Counts |
| EGRCOND | EGR Monitor Conditions Encountered Counts |
| AIRCOMP | AIR Monitor Completion Condition Counts (Secondary Air) |

-continued

| Mnemonic | Description |
| --- | --- |
| AIRCOND | AIR Monitor Conditions Encountered Counts (Secondary Air) |
| EVAPCOMP | EVAP Monitor Completion Condition Counts |
| EVAPCOND | EVAP Monitor Conditions Encountered Counts |
| SO2SCOMP1 | Secondary O2 Sensor Monitor Completion Counts Bank 1 |
| SO2SCOND1 | Secondary O2 Sensor Monitor Conditions Encountered Counts Bank 1 |
| SO2SCOMP2 | Secondary O2 Sensor Monitor Completion Counts Bank 2 |
| SO2SCOND2 | Secondary O2 Sensor Monitor Conditions Encountered Counts Bank 2 |

Service 09 PID OB

| Mnemonic | Description |
| --- | --- |
| OBDCOND | OBD Monitoring Conditions Encountered Counts |
| IGNCNTR | Ignition Counter |
| HCCATCOMP | NMHC Catalyst Monitor Completion Condition Counts |
| HCCATCOND | NMHC Catalyst Monitor Conditions Encountered Counts |
| NCATCOMP | NOx/SCR Catalyst Monitor Completion Condition Counts |
| NCATCOND | NOx/SCR Catalyst Monitor Conditions Encountered Counts |
| NADSCOMP | NOx Adsorber Monitor Completion Condition Counts |
| NADSCOND | NOx Adsorber Monitor Conditions Encountered Counts |
| PMCOMP | PM Filter Monitor Completion Condition Counts |
| PMCOND | PM Filter Monitor Conditions Encountered Counts |
| EGSCOMP | Exhaust Gas Sensor Monitor Completion Condition Counts |
| EGSCOND | Exhaust Gas Sensor Monitor Conditions Encountered Counts |
| EGRCOMP | EGR and/or VVT Monitor Completion Condition Counts |
| EGRCOND | EGR and/or VVT Monitor Conditions Encountered Counts |
| BPCOMP | Boost Pressure Monitor Completion Condition Counts |
| BPCOND | Boost Pressure Monitor Conditions Encountered Counts |
| FUELCOMP | Fuel Monitor Completion Condition Counts |
| FUELCOND | Fuel Monitor Conditions Encountered Counts |

Enumerated PIDs

Service 01 PID 03.

| Value | Description |
| --- | --- |
| 1 | Open loop due to insufficient engine temperature |
| 2 | Closed loop, using oxygen sensor feedback to determine fuel mix |
| 4 | Open loop due to engine load OR fuel cut due to deceleration |
| 8 | Open loop due to system failure |
| 16 | Closed loop, using at least one oxygen sensor but there is a fault in the feedback system |

Service 01 PID 12

| Value | Description |
| --- | --- |
| 1 | Upstream |
| 2 | Downstream of catalytic converter |
| 4 | From the outside atmosphere or off |
| 8 | Pump commanded on for diagnostics |

Service 01 PID 1C

| Value | Description |
| --- | --- |
| 1 | OBD-II as defined by the CARB |
| 2 | OBD as defined by the EPA |
| 3 | OBD and OBD-II |
| 4 | OBD-1 |
| 5 | Not OBD compliant |
| 6 | EOBD (Europe) |
| 7 | EOBD and OBD-II |
| 8 | EOBD and OBD |
| 9 | EOBD, OBD and OBD II |
| 10 | JOBD (Japan) |
| 11 | JOBD and OBD II |
| 12 | JOBD and EOBD |
| 13 | JOBD, EOBD, and OBD II |
| 14 | Reserved |
| 15 | Reserved |
| 16 | Reserved |
| 17 | Engine Manufacturer Diagnostics (EMD) |
| 18 | Engine Manufacturer Diagnostics Enhanced (EMD+) |
| 19 | Heavy Duty On-Board Diagnostics (Child/Partial) (HD OBD-C) |
| 20 | Heavy Duty On-Board Diagnostics (HD OBD) |
| 21 | World Wide Harmonized OBD (WWH OBD) |
| 22 | Reserved |
| 23 | Heavy Duty Euro OBD Stage I without NOx control (HD EOBD-I) |
| 24 | Heavy Duty Euro OBD Stage I with NOx control (HD EOBD-I N) |
| 25 | Heavy Duty Euro OBD Stage II without NOx control (HD EOBD-II) |
| 26 | Heavy Duty Euro OBD Stage II with NOx control (HD EOBD-II N) |
| 27 | Reserved |
| 28 | Brazil OBD Phase 1 (OBDBr-1) |
| 29 | Brazil OBD Phase 2 (OBDBr-2) |
| 30 | Korean OBD (KOBD) |
| 31 | India OBD I (IOBD I) |
| 32 | India OBD II (IOBD II) |
| 33 | Heavy Duty Euro OBD Stage VI (HD EOBD-IV) |
| 34-250 | Reserved |
| 251-255 | Not available for assignment (SAE J1939 special meaning) |

Fuel Type Coding
Service 01 PID 51:

| Value | Description |
| --- | --- |
| 0 | Not available |
| 1 | Gasoline |
| 2 | Methanol |
| 3 | Ethanol |
| 4 | Diesel |
| 5 | LPG |
| 6 | CNG |
| 7 | Propane |
| 8 | Electric |
| 9 | Bifuel running Gasoline |
| 10 | Bifuel running Methanol |
| 11 | Bifuel running Ethanol |
| 12 | Bifuel running LPG |
| 13 | Bifuel running CNG |
| 14 | Bifuel running Propane |
| 15 | Bifuel running Electricity |
| 16 | Bifuel running electric and combustion engine |
| 17 | Hybrid gasoline |
| 18 | Hybrid ethanol |
| 19 | Hybrid diesel |
| 20 | Hybrid electric |
| 21 | Hybrid electric and combustion engine |
| 22 | Hybrid regenerative |
| 23 | Bifuel running diesel |

Non-Standard Features:

The majority of all OBD-II PIDs in use are non-standard. For most modern vehicles, there are many more functions supported on the OBD-II interface than are covered by the standard PIDs, and there is relatively minor overlap between vehicle manufacturers for these non-standard PIDs.

An OBD may comprise a main controller circuit.

An OBD may comprise a +3.3V power supply.

An OBD may comprise an ISO transceiver circuit and a CAN transceiver circuit diagram.

FIG. 17 is a block diagram showing final price generation for the RepairBoss platform, in accordance with some embodiments. FIG. 18 is a schematic of a flow diagram of the RepairBoss platform showing a top level, in accordance with some embodiments.

FIG. 19 is a schematic of a flow diagram of the RepairBoss platform showing a register and a sign in process, in accordance with some embodiments. FIG. 20 is a schematic of a flow diagram of the RepairBoss platform showing an upload my Ads process, in accordance with some embodiments.

FIG. 21 is a schematic of a flow diagram of the RepairBoss platform showing create my interests process, in accordance with some embodiments. FIG. 22 is a schematic of a flow diagram of the RepairBoss platform showing my communication process, in accordance with some embodiments.

FIG. 23 is a schematic of a flow diagram of the RepairBoss platform showing buy and sell parts process, in accordance with some embodiments. FIG. 24 is a block diagram of a RepairBoss platform for providing 3D/VR model, in accordance with some embodiments. FIG. 25 is a schematic of a RepairBoss platform repair parts database design, in accordance with some embodiments.

FIG. 26 is a block diagram of a RepairBoss platform providing compensation to a user in case of an accident, in accordance with some embodiments. Further, the user may meet an accident and upload pictures of damaged parts. Further, an insurance company may receive the accident information and may contact a collision centre. Further, the insurance company may look for a local mechanic from database associated with a server of the RepairBoss platform. Further, a third-party data provider may provide diagnostic information and a price estimate of the damaged parts to the user. Further, the user may make payment to the mechanic and get the car repaired. Further, the insurance company may evaluate the total loss to the car and generate compensation for the user. Further, if the user wants a new car, a vehicle dealer may provide vehicle information to the user. Further, if the user wants to rent a car, a vehicle rental company may provide car rental information to the user. Further, if the user do not want anything, the case may be closed.

In FIG. 26, a user database is indicated at 222, a vehicle damage database is indicated at 232, a vehicle repair price database is indicated at 242, and a destroyed vehicle database is indicated at 252.

With reference to FIG. 27, a system consistent with an embodiment of the disclosure may include a computing device or cloud service, such as computing device 5100. In a basic configuration, computing device 5100 may include at least one processing unit 5102 and a system memory 5104. Depending on the configuration and type of computing device, system memory 5104 may comprise, but is not limited to, volatile (e.g. random-access memory (RAM)), non-volatile (e.g. read-only memory (ROM)), flash memory, or any combination. System memory 5104 may include operating system 5105, one or more programming modules 5106, and may include a program data 5107. Operating system 5105, for example, may be suitable for controlling computing device 5100's operation. In one embodiment, programming modules 5106 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 27 by those components within a dashed line 5108.

Computing device 5100 may have additional features or functionality. For example, computing device 5100 may also include additional data storage devices (removable and/or non-removable) such as, for example, magnetic disks, optical disks, or tape. Such additional storage is illustrated in FIG. 27 by a removable storage 5109 and a non-removable storage 5110. Computer storage media may include volatile and nonvolatile, removable and non-removable media implemented in any method or technology for storage of information, such as computer-readable instructions, data structures, program modules, or other data. System memory 5104, removable storage 5109, and non-removable storage 5110 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 5100. Any such computer storage media may be part of device 5100. Computing device 5100 may also have input device(s) 5112 such as a keyboard, a mouse, a pen, a sound input device, a touch input device, a location sensor, a camera, a biometric sensor, etc. Output device(s) 5114 such as a display, speakers, a printer, etc. may also be included. The aforementioned devices are examples and others may be used.

Computing device 5100 may also contain a communication connection 5116 that may allow device 5100 to communicate with other computing devices 5118, such as over a network in a distributed computing environment, for example, an intranet or the Internet. Communication connection 5116 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 5104, including operating system 5105. While executing on processing unit 5102, programming modules 5106 (e.g., application 5120 such as a media player) may perform processes including, for example, one or more stages of methods, algorithms, systems, applications, servers, databases as described above. The aforementioned process is an example, and processing unit 5102 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

With reference to FIG. 28, the proposed system will detect autonomous vehicle collisions and communicates the vehicular accident information (including the cause, the location of accident, and vehicle's information to the designated cloud server) by utilizing the 5G technology network pinpointing the geolocation.

Additionally, the proposed invention would detect the weight of the vehicle against the load bearing capacity in real time and be able to distribute the information to the centrally designated database (insurance, transport ministry, warranty claim company, collision reporting center, etc.). Powered by the Artificial Intelligence and Predictive Analytics at its core, the proposed innovation would combine the intelligence of the modern technologies with the advancement of internet connectivity to deliver a new experience in the automotive industry. We believe that the 5G environment is particularly well-suited to implement these features, as the antennae are very densely located, less than 500 ft apart.

We are proposing the fitting of a device into each vehicle that uses proximity, vibrations and location data to confirm collisions. The device would then transmit information through the 5G network, resulting in a significant increase in response time, as well as overall road safety. The information transmitted will be fully encrypted by blockchain encryption to ensure the highest level of privacy, security and data protection.

5G geolocation identification is a widely available technology with proven benefits and viability, however, collision tracking specifically is somewhat of an unchartered territory, and is therefore less researched. The use of a physical device is required so that our unique and proprietary technology can minimize the incidence of false positives, meaning that it will not alert when cars have come close, but not actually collided. Our built-in sensors will be able to accurately measure the severity of collisions, thereby allowing for the most appropriate allocation of resources for the response teams.

Based on data obtained from our preliminary market research, we firmly believe that the extensive benefits of this product allow for full diversification of prospective revenue sources; such as Car manufacturers, as inevitably they will all be equipped with self-driving technology Municipalities for the dispatching of ambulance, police, fire and other response teams Licensing of the software without the device We are aware that some countries' governments are actively seeking to equip their transportation departments with such technology, and we would like to remain at the forefront of the research in this sector.

In order for our products' market readiness status to increase, we are in need of additional R&D with regards to developing the prototype, as well as testing in a 5G environment.

Although the invention has been explained in relation to its preferred embodiment, it is to be understood that many other possible modifications and variations can be made without departing from the spirit and scope of the invention.

The invention claimed is:

1. A system for facilitating repair of a problem with a vehicle of a user, the system comprising:
   a diagnostic device arranged in operative connection with a computer system of a vehicle and configured to receive and wirelessly transmit error signals from the computer system of the vehicle;
   a first server in operative communication with the diagnostic device and configured to receive the error signals from the vehicle's computer system, wherein the first server has a processor and a non-transitory readable storage medium storing instructions which are executable by the processor to:
      identify, based on the error signals transmitted by the diagnostic device, one or more problems associated with the user's vehicle;
      identify, based on location of the user and the one or more identified problems, available service centres for remedying the one or more identified problems;
      estimate, for the user, based on the available vehicle service centres, a cost of a repair to remedy the one or more identified problems;
      schedule, for the user, an appointment for the repair at a selected one of the available service centres;
   a second server in operative communication with the first server, wherein the second server has a processor and a non-transitory readable storage medium storing instructions which are executable by the processor to:
      receive, from a plurality of service centres and from part manufacturers, information about replacement vehicle parts available for purchase therefrom;
      form, based on the information about the replacement vehicle parts available for purchase from the service centres and from the part manufacturers, a database of listings by vendors of the replacement vehicle parts available for viewing by the service centres on the Internet;
      transmit electronic payment information from a respective one of the service centres to a respective one of the vendors associated with a respective one of the listings to form a purchase, wherein the purchase is associated with a corresponding repair to be performed by the service centre.

2. The system of claim 1 wherein the first server further includes instructions stored on the non-transitory storage medium thereof and executable by the processor to:
   display, to the user, based on the user's location, car rental information from rental car companies.

3. The system of claim 1 wherein, when the diagnostic device remains operatively connected to the vehicle during movement thereof, the diagnostic device is further configured to detect a collision in which the vehicle is involved and to transmit information about the vehicle responsive to detection of the collision and associated with the collision.

4. The system of claim 3 wherein the first server further includes instructions stored on the non transitory storage medium thereof and executable by the processor to:
   receive, from the diagnostic device, the information about the vehicle and associated with the collision; and
   transmit, to at least one of an insurance provider and a governmental transport ministry, the information about the vehicle and associated with the collision.

5. The system of claim 3 wherein the information about the vehicle and associated with the collision that is transmissible by the diagnostic device includes at least one of:
   location of the vehicle at the time of the collision; and
   weight of the vehicle at the time of the collision.

6. The system of claim 3 wherein, when the information about the vehicle and associated with the collision that is transmissible by the diagnostic device includes weight of the vehicle at the time of the collision, the diagnostic device is further configured to compare the weight of the vehicle at the time of the collision to a load bearing capacity of the vehicle.

* * * * *